United States Patent
Son et al.

(10) Patent No.: US 11,017,197 B2
(45) Date of Patent: May 25, 2021

(54) METHOD OF OPERATING FINGERPRINT SENSING SYSTEM, AND FINGERPRINT SENSING SYSTEM

(71) Applicant: SAMSUNG ELECTRONICS CO., LTD., Suwon-si (KR)

(72) Inventors: Kyunghyun Son, Seongnam-si (KR); Dongkyun Kim, Suwon-si (KR); Jinmyoung Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/712,341

(22) Filed: Dec. 12, 2019

(65) Prior Publication Data

US 2020/0193128 A1    Jun. 18, 2020

(30) Foreign Application Priority Data

Dec. 14, 2018    (KR) .................... 10-2018-0162149

(51) Int. Cl.
   G06K 9/28    (2006.01)
   G06K 9/00    (2006.01)

(52) U.S. Cl.
   CPC ....... G06K 9/00026 (2013.01); G06K 9/0008 (2013.01); G06K 9/00926 (2013.01)

(58) Field of Classification Search
   CPC ............... G06K 9/0002; G06K 9/0008; G06K 9/00006–9/0012
   See application file for complete search history.

(56) References Cited

U.S. PATENT DOCUMENTS

| | | |
|---|---|---|
| 6,993,164 B2 | 1/2006 | Jang |
| 7,030,860 B1 | 4/2006 | Hsu et al. |
| 8,564,314 B2 | 10/2013 | Shaikh et al. |
| 8,599,150 B2 | 12/2013 | Philipp |
| 8,867,799 B2 | 10/2014 | Benkley, III |
| 9,141,239 B2 | 9/2015 | Yun et al. |
| 9,261,991 B2 | 2/2016 | Alameh et al. |
| 9,342,733 B2 | 5/2016 | Lee et al. |
| 9,990,081 B2 | 6/2018 | Kim |
| 10,127,427 B2 | 11/2018 | Lee et al. |
| 10,311,275 B2 | 6/2019 | Hong et al. |

(Continued)

FOREIGN PATENT DOCUMENTS

| | | |
|---|---|---|
| JP | 2006039777 A | 2/2006 |
| KR | 100460825 B1 | 12/2004 |

(Continued)

OTHER PUBLICATIONS

David Zhang et al., "Selecting a Reference High Resolution for Fingerprint Recognition Using Minutiae and Pores", IEEE Transactions on Instrumentation and Measurement, vol. 60, No. 3, Mar. 2011, pp. 863-871. (Year: 2011).*

(Continued)

*Primary Examiner* — Brian Werner
(74) *Attorney, Agent, or Firm* — Sughrue Mion, PLLC

(57) ABSTRACT

A fingerprint sensing system obtains a fingerprint image of a user by analyzing a partial image sensed with respect to a portion of a fingerprint region of the user, determining a sensing resolution based on a fingerprint pitch of the analyzed partial image, and sensing the fingerprint region with a determined sensing resolution.

20 Claims, 22 Drawing Sheets

(56) References Cited

U.S. PATENT DOCUMENTS

| | | |
|---|---|---|
| 10,345,950 B2 | 7/2019 | Yoon et al. |
| 10,528,086 B2 | 1/2020 | Chung |
| 10,572,058 B2 | 2/2020 | Kim et al. |
| 2006/0018523 A1 | 1/2006 | Saitoh et al. |
| 2009/0067684 A1* | 3/2009 | Mainguet ............. G06K 9/0002 382/124 |
| 2018/0157890 A1 | 6/2018 | Hillmann et al. |
| 2018/0165494 A1 | 6/2018 | Kim |
| 2018/0211078 A1 | 7/2018 | Lillie et al. |
| 2019/0042035 A1 | 2/2019 | Kim |
| 2020/0019744 A1 | 1/2020 | Kim |

FOREIGN PATENT DOCUMENTS

| | | |
|---|---|---|
| KR | 1020070041816 A | 4/2007 |
| KR | 101249680 B1 | 4/2013 |
| KR | 1020160003272 A | 1/2016 |
| KR | 1020170124025 A | 11/2017 |
| KR | 1020170129476 A | 11/2017 |
| KR | 1020180022391 A | 3/2018 |
| KR | 1020180024500 A | 3/2018 |
| KR | 1020180067226 A | 6/2018 |
| KR | 1020180083921 A1 | 7/2018 |
| KR | 1020190014931 A | 2/2019 |
| KR | 1020190015876 A | 2/2019 |
| WO | 2014193786 A1 | 12/2014 |

OTHER PUBLICATIONS

Communication dated Apr. 22, 2020, issued by the European Patent Office in counterpart European Application No. 19215316.1.

* cited by examiner

FIG. 15

| Binning Size<br>Resolution | 2 x 2 | 3 x 3 | 4 x 4 | 5 x 5 |
|---|---|---|---|---|
| 1016ppi<br>(25um) | 50um | 75um | 100um | 125um |
| 508ppi<br>(25um x 2) | 100um | 150um | 200um | 256um |
| 339ppi<br>(25um x 3) | 150um | 225um | 300um | 375um |
| 254ppi<br>(25um x 4) | 200um | 300um | 400um | 500um |

2×2 Binning

3×3 Binning

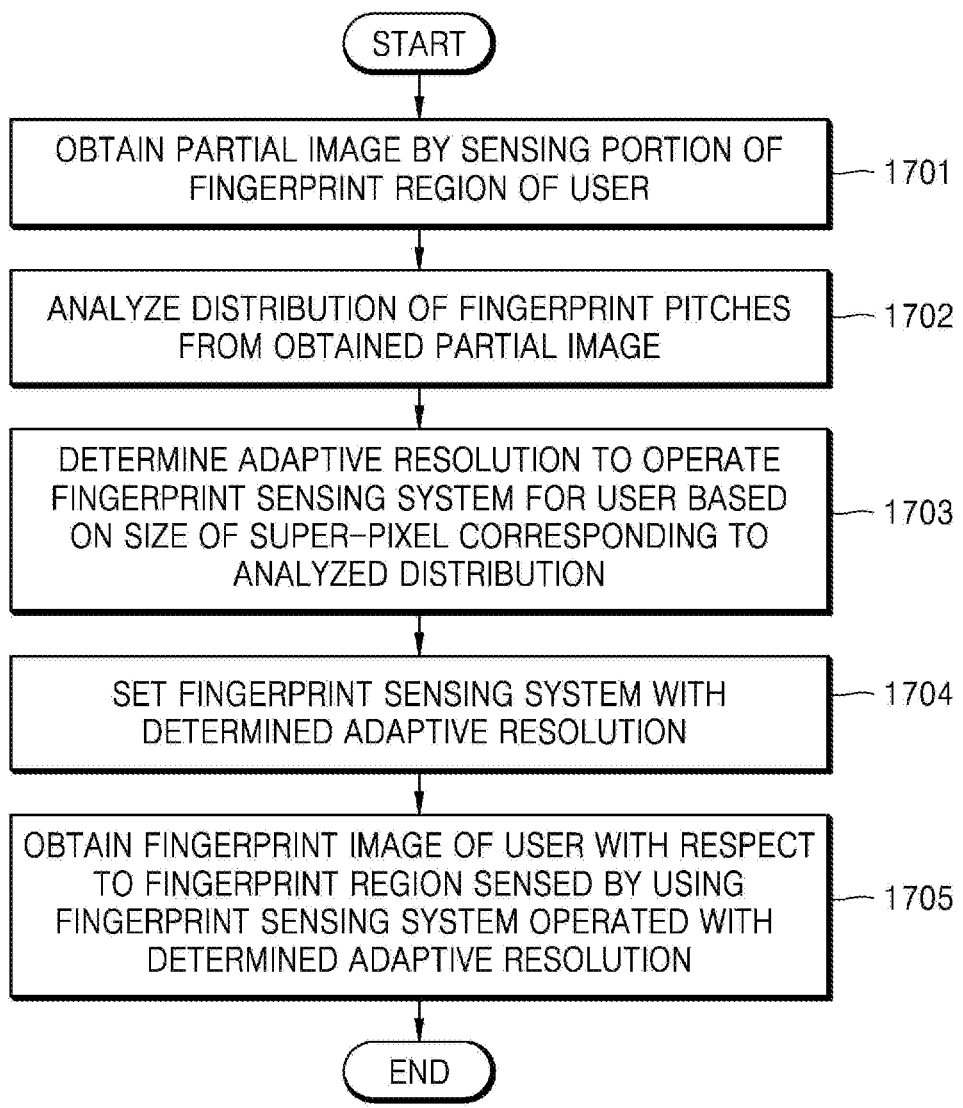

METHOD OF OPERATING FINGERPRINT SENSING SYSTEM, AND FINGERPRINT SENSING SYSTEM

CROSS-REFERENCE TO RELATED APPLICATION

This application claims priority from Korean Patent Application No. 10-2018-0162149, filed on Dec. 14, 2018, in the Korean Intellectual Property Office, the disclosure of which is herein incorporated by reference in its entirety.

BACKGROUND

1. Field

Methods, apparatuses, and systems consistent with the disclosure relate to a method of operating a fingerprint sensing system for fingerprint recognition, the fingerprint sensing system, and an apparatus for sensing a fingerprint.

2. Description of the Related Art

The demands for performing personal authentication based on features such as a fingerprint, voice, a face, a hand, or an iris are gradually increasing. Personal authentication functions are mainly used in financial devices, access control devices, mobile devices, laptops, etc. Recently, as mobile devices such as smartphones have become widespread, fingerprint recognition technology for personal authentication has been widely adopted to protect a large amount of security information stored in smartphones.

SUMMARY

One or more example embodiments provide a fingerprint sensing system for fingerprint recognition, and a method of operating a fingerprint sensing system for fingerprint recognition, the fingerprint sensing system, and an apparatus for sensing a fingerprint, in which fingerprint recognition is performed with high accuracy, improved processing speed and efficiency, and reduced computation.

Additional aspects will be set forth in part in the description which follows and, in part, will be apparent from the description, or may be learned by practice of the example embodiments.

According to an aspect of an example embodiment, provided is a method of operating a fingerprint sensing system includes obtaining a partial image sensed with respect to a portion of a fingerprint region of a user, analyzing a distribution of fingerprint pitches from the obtained partial image, determining an adaptive resolution at which to operate the fingerprint sensing system with respect to the user, based on a size of a super-pixel corresponding to the analyzed distribution of fingerprint pitches, setting the fingerprint sensing system to the determined adaptive resolution, and obtaining a fingerprint image of the user with respect to the fingerprint region sensed by using the fingerprint sensing system operated at the determined adaptive resolution.

According to an aspect of another example embodiment, a non-transitory computer-readable recording medium having recorded thereon a program, executable by a processor to perform the above method.

According to an aspect of another embodiment, a fingerprint sensing system includes at least one processor performing reading and operating, based on instructions in a computer program, and at least one memory storing at least a portion of the computer program for access by the at least one of processor, wherein the at least one of processor is configured to obtain a partial image sensed with respect to a portion of a fingerprint region of a user, analyze a distribution of fingerprint pitches from the obtained partial image, determine an adaptive resolution at which to operate the fingerprint sensing system with respect to the user based on a size of a super-pixel corresponding to the analyzed distribution of fingerprint pitches, set the fingerprint sensing system to the determined adaptive resolution, and obtain a fingerprint image of the user with respect to the fingerprint region sensed by using the fingerprint sensing system operated at the determined adaptive resolution.

BRIEF DESCRIPTION OF THE DRAWINGS

The above and/or other aspects will become apparent and more readily appreciated from the following description of example embodiments, taken in conjunction with the accompanying drawings in which:

FIG. 15 illustrates a case in which both an adaptive resolution and a binning size are simultaneously adjusted, according to an example embodiment;

FIG. 17 is a flowchart of a method of operating a fingerprint sensing system, according to an example embodiment.

DETAILED DESCRIPTION

Figure 1:
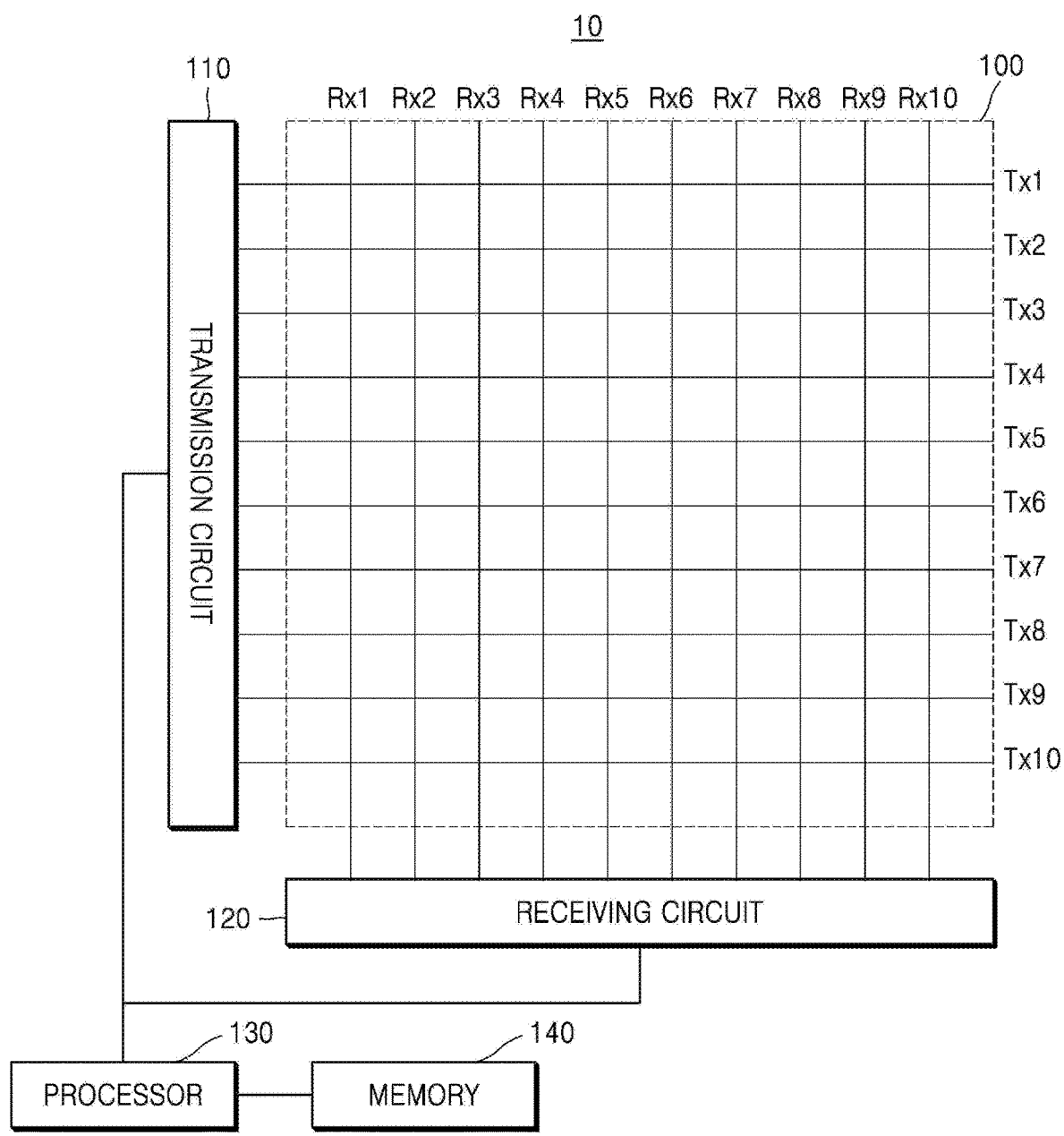
FIG. 1 illustrates an example of a fingerprint sensing system according to an example embodiment.

Reference will now be made in detail to embodiments, examples of which are illustrated in the accompanying drawings, wherein like reference numerals refer to like elements throughout. The example embodiments may have different forms and should not be construed as being limited to the descriptions set forth herein. Accordingly, some of the example embodiments are merely described below, by referring to the figures, to explain aspects of the disclosure.

In example embodiments set forth herein, general terms that have been widely used nowadays are selected, if possible, in consideration of functions of the example embodiments, but non-general terms may be selected according to the intentions of technicians in the this art, precedents, or new technologies, etc. Some terms may be arbitrarily chosen by the applicant. In this case, the meanings of these terms will be explained in corresponding parts of the disclosure in detail. Thus, the terms used herein should be defined not based on the names thereof but based on the meanings thereof and the whole context of the example embodiments.

In the example embodiments, it will be understood that when an element is referred to as being "connected to" another element, the element may be directly connected to another element or may be electrically connected to another element while having intervening elements therebetween. It will be understood that when an element is referred to "including" another element, the element may further other elements unless mentioned otherwise.

The terms "comprises", "comprising", "includes", and "including" used herein should not be construed as necessarily including all various elements or operations described herein and should be understood that some of the elements or operations may be omitted or additional elements or operations may be further provided.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that, although the terms first, second, third, etc., may be used herein to describe various elements, these elements should not be limited by these terms. These terms are only used to distinguish one element from another element. In addition, the terms, such as "part", "unit", "portion", "module", "block", etc., should be understood as a unit that performs at least one function or operation and that may be embodied as hardware, software, or a combination thereof.

The following description of the example embodiments should not be construed as limiting the scope of the disclosure, and modifications to the embodiments that would be easily derived by those of ordinary skill in the art should be construed as being within the scope of the disclosure.

Hereinafter, for only illustrative purposes, example embodiments will be described in detail with reference to the accompanying drawings.

FIG. 1 illustrates an example of a fingerprint sensing system according to an example embodiment.

Referring to FIG. 1, a fingerprint sensing system 10 may include a touch panel 100, a transmission circuit 110, a receiving circuit 120, a processor 130, and a memory 140. Although FIG. 1 illustrates constituent elements of the fingerprint sensing system 10, one of ordinary skill in the art would understand that some of elements may be omitted and/or modified, and additional and/or optional elements may be further included therein.

The processor 130 illustrated in FIG. 1 may be embodied by an array of a plurality of logic gates, or by a combination of a universal microprocessor and a memory in which a program executable by the microprocessor is stored. The processor 130 may include at least one processor (or processing unit), and in an example embodiment, the processor 130 may include a plurality of processors. Furthermore, one of ordinary skill in the art would understand that the processor 130 may be embodied by hardware configurations in any other arbitrary form.

The touch panel 100 may include a plurality of drive electrodes Tx and a plurality of detection electrodes Rx formed in a direction crossing the plurality of drive electrodes Tx. Although FIG. 1 illustrates that, for convenience of explanation, the number of each of the plurality of drive electrodes Tx and the plurality of detection electrodes Rx are ten, the disclosure is not limited thereto, and the numbers of the plurality of drive electrodes Tx and the plurality of detection electrodes Rx may be varied.

The transmission circuit 110 may apply a drive signal to the plurality of drive electrodes Tx, and the receiving circuit 120 may obtain an electric signal from the plurality of detection electrodes Rx. To this end, the transmission circuit 110 may include a module (not shown) that applies the drive signal to the plurality of drive electrodes Tx, and the receiving circuit 120 may include a module (not shown) that obtains the electric signal from the plurality of detection electrodes Rx.

The plurality of drive electrodes Tx of the touch panel 100 may extend in a first direction, and the plurality of detection electrodes Rx of the touch panel 100 may extend in a second direction crossing the first direction. Although FIG. 1 illustrates an example embodiment in which the drive electrodes Tx and the detection electrodes Rx are orthogonal to each other, the disclosure is not limited thereto. In other words, an angle between the first direction in which the drive electrodes Tx extend and the second detection in which the detection electrodes Rx extend may not be 90°.

When an object such as a user's finger approaches the touch panel 100, mutual capacitance between each of the drive electrodes Tx and the detection electrodes Rx of the touch panel 100 may vary. For example, the mutual capacitance at each of nodes at which the drive electrodes Tx and the detection electrodes Rx cross each other due to the user's finger approaching to the touch panel 100 may be different from each other based on the characteristics of a fingerprint pattern of the user's finger. As an interval between the drive electrodes Tx and an interval between the detection electrodes Rx decrease, a sensing resolution for sensing a fingerprint region may increase. A protective film for protecting the drive electrodes Tx and the detection electrodes Rx may be further provided on the touch panel 100.

The drive electrodes Tx and the detection electrodes Rx may be provided as line electrodes. Furthermore, each of the drive electrodes Tx may further include patterns provided between the nodes at which the drive electrodes Tx and the detection electrodes Rx cross each other. The patterns may have various shapes such as a polygon or a circle. Likewise, each of the detection electrodes Rx may further include patterns provided between the nodes.

The transmission circuit 110 may apply a drive signal to the drive electrodes Tx. For example, the transmission circuit 110 may apply a voltage pulse to each of the drive electrodes Tx. The receiving circuit 120 may obtain an electric signal from the detection electrodes Rx. In this state, the receiving circuit 120 may obtain a current flowing in each of the detection electrodes Rx or obtain an electric potential of each of the detection electrodes Rx.

The processor 130 may control overall operations of the transmission circuit 110 and the receiving circuit 120 included in the fingerprint sensing system 10. For example, the processor 130 may control the amplitude and duration of a voltage pulse that is applied by the transmission circuit 110 to each of the drive electrodes Tx. Furthermore, the processor 130 may control the transmission circuit 110 such that a voltage pulse can be applied to some of the drive electrodes Tx among the plurality of drive electrodes Tx included in the touch panel 100.

The processor 130 may generate and process image data related to a fingerprint or minutiae data of the user by using the current or electric potential that is obtained by the receiving circuit 120. For example, the processor 130 may generate and process fingerprint image data corresponding to the fingerprint region by using the current or electric potential that is obtained by the receiving circuit 120, and generate and process minutiae data by analyzing pixel values included in the image data.

The processor 130 may determine characteristics of the fingerprint of the user by analyzing the fingerprint image and the minutiae data and adaptively change a sensing resolution for operating the fingerprint sensing system 10 based on the determined characteristics of the fingerprint. Descriptions in this regard are presented below in detail with reference to the relevant drawings.

The memory 140 may store a computer program executable to perform the operation of the processor 130. For example, the processor 130 may read the computer program stored in the memory 140 and perform operation based on instructions in the computer program. Furthermore, the memory 140 may store data and information generated based on operation of one or more of the touch panel 100), the transmission circuit 110, the receiving circuit 120, and the processor 130. Although FIG. 1 illustrates that the fingerprint sensing system 10 includes one memory as the memory 140, the disclosure is not limited thereto, and the fingerprint sensing system 10 may include two or more memories, depending on an embodiment. In an example embodiment, the processor 130 and the memory 140 may be provided in an apparatus for sensing a fingerprint (or a fingerprint sensing apparatus), FIG. 2 conceptually illustrates mutual capacitance corresponding to each of nodes of the touch panel 100.

Figure 2:
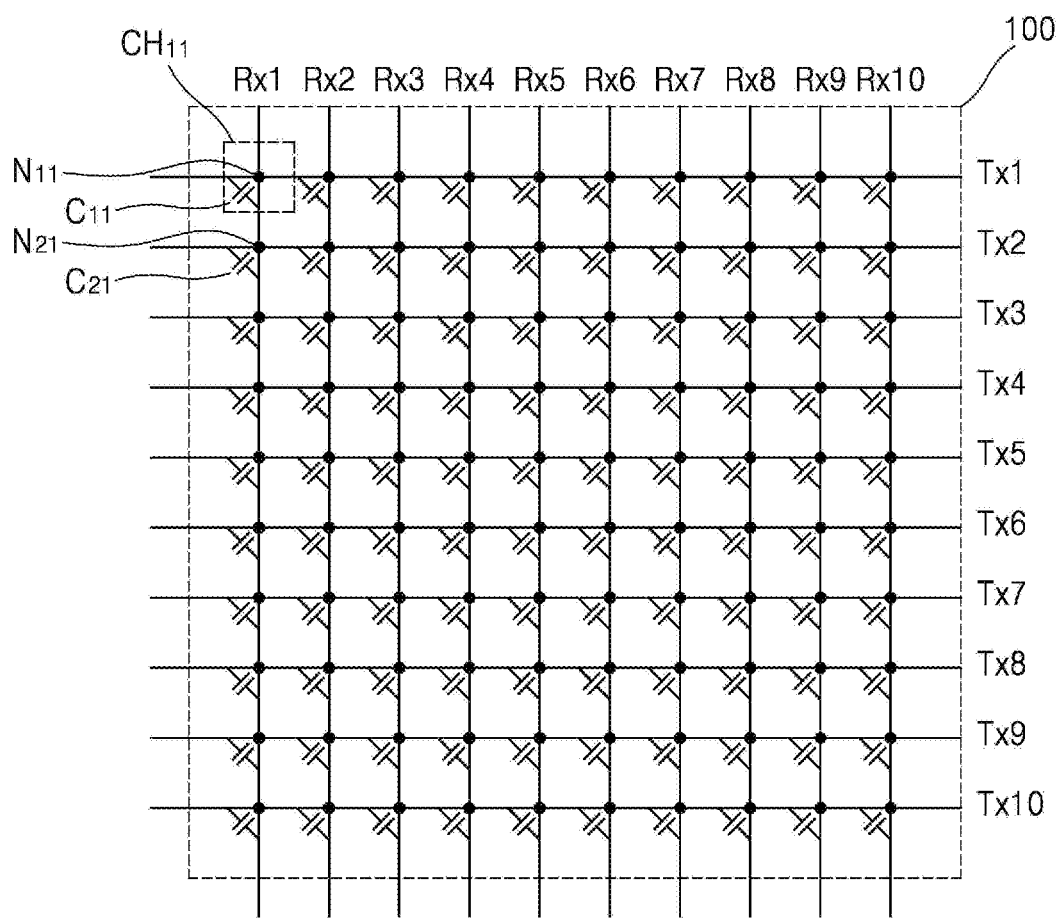
FIG. 2 conceptually illustrates mutual capacitance corresponding to each of nodes of a touch panel according to an example embodiment.

Referring to FIG. 2, the mutual capacitance between the drive electrodes Tx and the detection electrodes Rx may correspond to the nodes at which the drive electrodes Tx and the detection electrodes Rx cross each other.

For example, mutual capacitance C11 between a first drive electrode Tx1 and the first detection electrode Rx1 may correspond to a node N11 at which the first drive electrode Tx1 and the first detection electrode Rx1 cross each other. Likewise, mutual capacitance $C_{mn}$ between an m-th drive electrode Txm, where m is a natural number, and an n-th detection electrode Rxn, where n is a natural number, may correspond to a node Nm where the m-th drive electrode Txm and the n-th detection electrode Rxn cross each other. In the following description, mutual capacitance at the node $N_{mn}$ may denote the mutual capacitance between the m-th drive electrode Txm and the n-th detection electrode Rxn.

A plurality of channels may be defined in the touch panel 100 by the drive electrodes Tx and the detection electrodes Rx. For example, a certain channel may correspond to a node that is defined by a drive electrode Tx and a detection electrode Rx crossing each other. For example, a channel $CH_{11}$ may correspond to the node $N_{11}$.

Different drive signals may be sequentially applied to each of the drive electrodes Tx to obtain mutual capacitance at each of a plurality of nodes. Furthermore, an electric signal may be individually obtained at each of the detection electrodes Rx. For example, when the mutual capacitance $C_{11}$ is to be obtained, a drive signal may be applied only to the first drive electrode Tx1, and an electric signal at the first detection electrode Rx1 may be obtained. Likewise, when the mutual capacitance $C_{mn}$ is to be obtained, a drive signal is applied only to the m-th drive electrode Txm, and an electric signal may be obtained at the n-th detection electrode Rxn.

In order to obtain mutual capacitance at each node, a drive signal may be applied only to one drive electrode Tx. However, when the fingerprint sensing system 10 is driven with a high sensing resolution, the interval between the drive electrodes Tx may be narrow. When the interval between the drive electrodes Tx decreases, the area of a channel CH that is activated during the detection of the mutual capacitance decreases. When the activated area of the channel CH decreases, the intensity of an obtained signal may decrease, and thus an amount of change in mutual capacitance obtained at each node may be excessively small. Accordingly, the sensing sensitivity may be lowered, and thus the processing efficiency of the fingerprint sensing system 10 may be degraded. On the other hand, when the fingerprint sensing system 10 is operated with a low sensing resolution, the interval between the drive electrodes Tx may be wide, and thus the activated area of the channel CH during the detection of the mutual capacitance increases, thereby increasing the amount of change in mutual capacitance. However, accurate fingerprint detection may become difficult (e.g., fingerprint recognition rate may be lowered).

Figure 3:
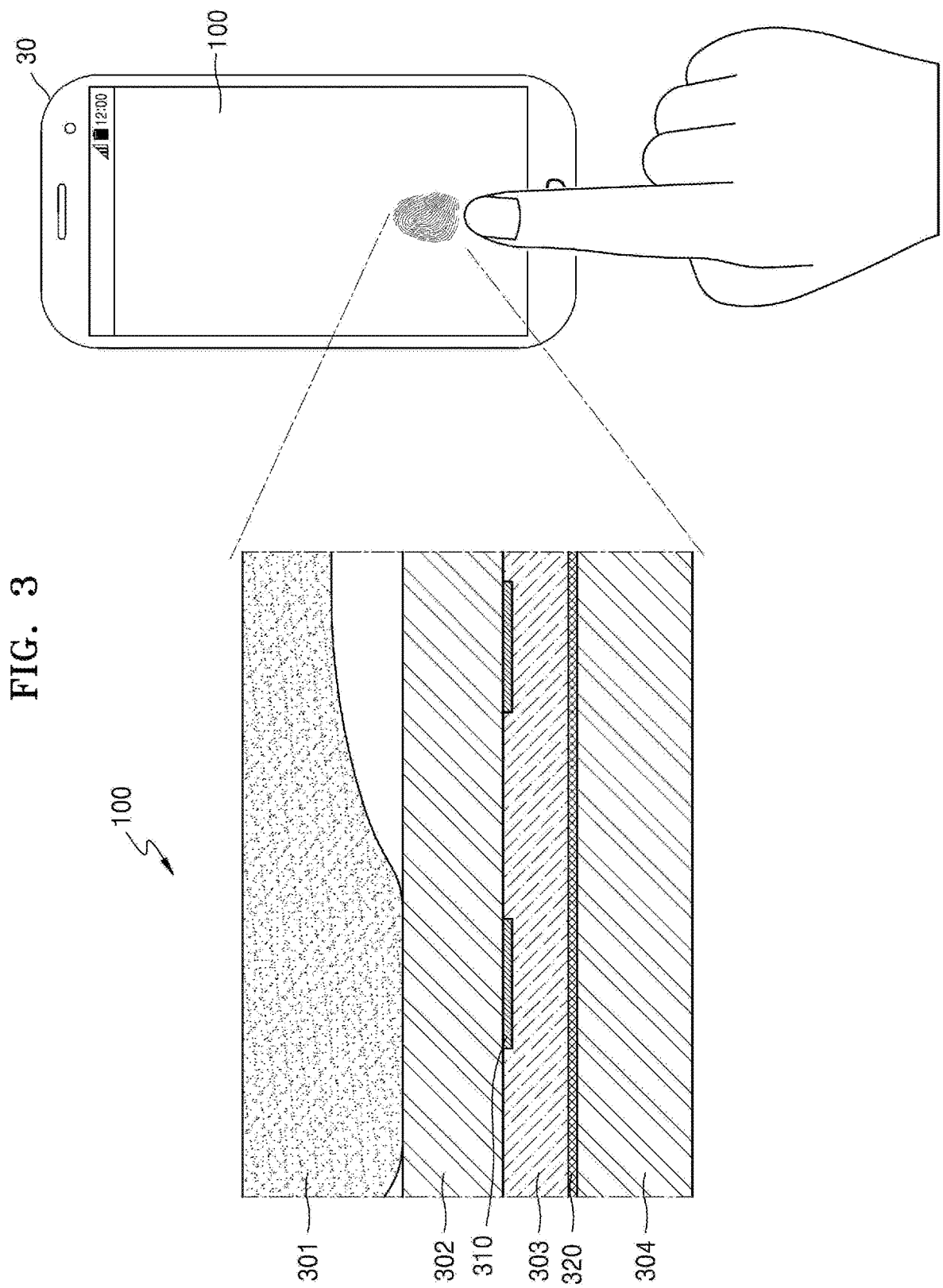
FIG. 3 is a cross-sectional view of a touch panel for fingerprint sensing mounted on an electronic apparatus, according to an example embodiment.

FIG. 3 is a cross-sectional view of the touch panel 100 for fingerprint sensing mounted on an electronic apparatus 30, according to an example embodiment.

Referring to FIG. 3, the touch panel 100 may include layers of a passivation layer 302, an insulating layer 303, and a substrate 304, and a detection electrode Rx 310 may be positioned between the passivation layer 302 and the insulating layer 303, and a drive electrode Tx 320 may be positioned between the insulating layer 303 and the substrate 304.

The touch panel 100 may be provided on a front surface of the electronic apparatus 30, and the touch panel 100 may correspond to a touch input interface for manipulating the electronic apparatus 30. Furthermore, the touch panel 100 may operate as a fingerprint sensor for sensing a fingerprint of a fingertip 301 of a user. In this state, the touch panel 100, as described above in FIGS. 1 and 2, may recognize a fingerprint pattern of a user by detecting different mutual capacitances to a ridge and a valley, that is, a difference in the amount of change in mutual capacitances, and identify a fingerprint of the user.

Although FIG. 3 illustrates an example in which, for convenience of explanation, the touch panel 100 is provided on the front surface of the electronic apparatus 30 and operates as a touch input interface and a fingerprint sensor of the electronic apparatus 30, the disclosure is not limited thereto, and the touch panel 100 according to an example embodiment may be implemented as a fingerprint sensor only for a fingerprint image generation system.

Figure 4:
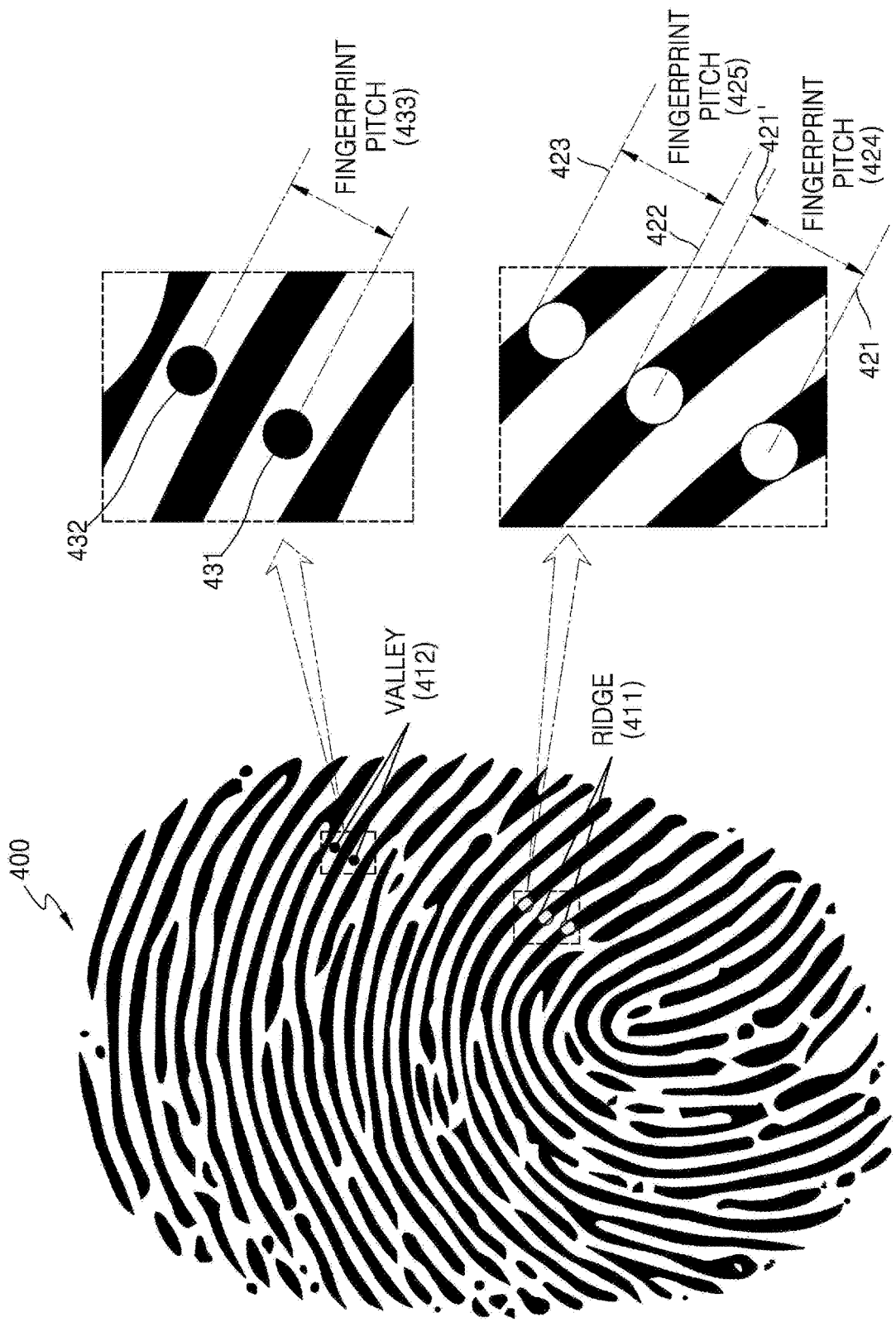
FIG. 4 illustrates a fingerprint region for use in a fingerprint sensing system according to an example embodiment.

FIG. 4 illustrates a fingerprint region 400 for use in a fingerprint sensing system according to an example embodiment.

The fingerprint region 400 having an intrinsic geometrical pattern for each user is widely used as a device for identifying a user.

Referring to FIG. 4, the fingerprint region 400 may include minutiae that are expressed by a plurality of ridges 411 and a plurality of valleys 412. The plurality of ridges 411 may denote, for example, a ridge crossover, a ridge core, a ridge bifurcation, a ridge ending, a ridge island, a ridge delta, and/or a ridge pore, which may be interpreted to be intrinsic minutiae for identifying a user.

In the present specification, a ridge interval between ridge lines 421 and 421', or between ridge lines 422 and 423, corresponding to the ridges 411 is defined to be a fingerprint pitch 424 or 425. For example, the fingerprint pitch 424 may correspond to an interval between a center of a ridge, e.g., the ridge line 421 passing therethrough, and a center of another neighboring ridge, e.g., the ridge line 421' passing therethrough, or the fingerprint pitch 425 may correspond to an interval between one end of a ridge, e.g., the ridge line 422 passing therethrough, and a corresponding end of another neighboring ridge, e.g., the ridge line 423 passing therethrough. In another example, a fingerprint pitch 433 may correspond to an interval between neighboring valleys 431 and 432. In other words, the fingerprint pitch may denote a cycle (or interval) of repetition of a pair of a ridge and a valley in the fingerprint region. However, the disclosure is not limited thereto, and other terms may be used for the above term denoting the fingerprint pitch.

In a case where a distribution of fingerprint pitches is analyzed to determine that the fingerprint pitch 424, 425, or 433 is a relatively large fingerprint, and the fingerprint sensing system 10 is operated with a relatively high sensing resolution, the amount of change in mutual capacitance obtained at each node is excessively small. Accordingly, the sensing sensitivity may be lowered, and thus the processing efficiency of the fingerprint sensing system 10 may be degraded. Also, a calculation process amount of the fingerprint sensing system 10 is inefficiently increased. On the other hand, in a case where the fingerprint sensing system 10 is operated with a relatively low sensing resolution and that the fingerprint pitch 424, 425, or 433 is determined to be a relatively small fingerprint, the amount of change in mutual capacitance obtained at each node may not accurately reflect the ridges 411 and valleys 412 included in the fingerprint region 400. Accordingly, accurate fingerprint detection may become difficult (e.g., fingerprint recognition rate may be lowered).

The processor 130 of FIG. 1 according to an example embodiment may determine the distribution of the fingerprint pitch 424, 425, or 433 included in the fingerprint region 400 of a user and adaptively change the sensing resolution of the fingerprint sensing system 10, thereby operating the fingerprint sensing system 10 with an optimal sensing resolution to the fingerprint of the user. Therefore, according to an example embodiment, the sensing sensitivity, accuracy, and processing efficiency may be improved.

Figure 5:
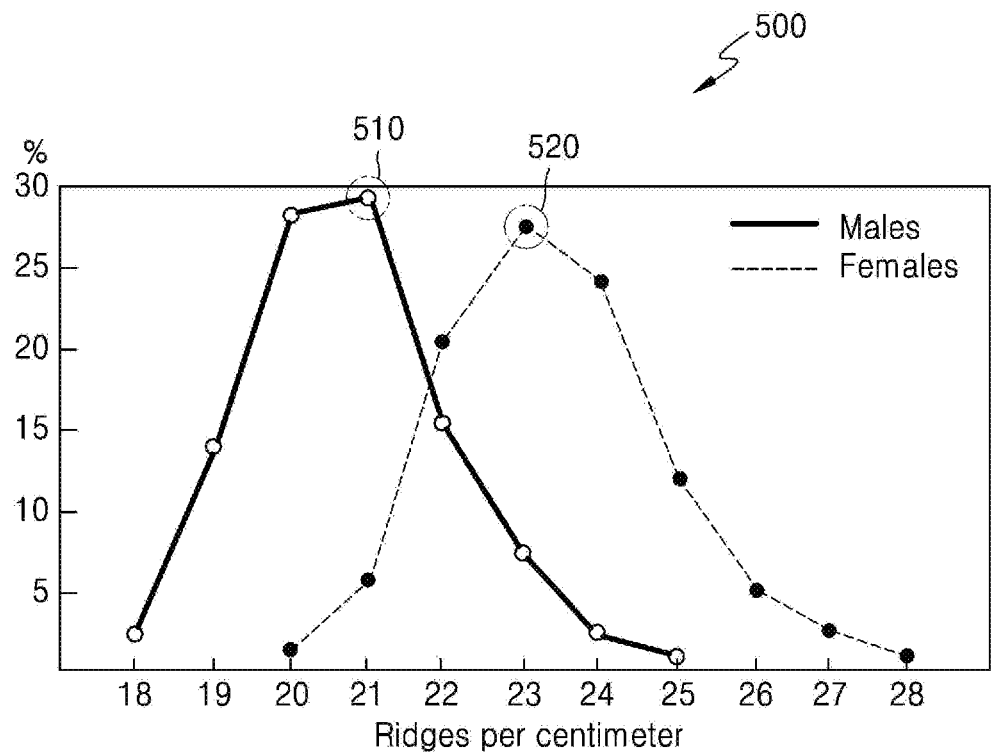
FIG. 5 is a graph showing a difference in a distribution of fingerprint pitches between males and females, for use in a fingerprint sensing system according to an example embodiment.

FIG. 5 is a graph 500 showing a difference in the distribution of fingerprint pitches between males and females, for use in a fingerprint sensing system according to an example embodiment.

Referring to the graph 500 of FIG. 5, the distribution of fingerprint pitches, for example, ridge intervals, in a person's fingerprint may have different distributions depending on gender, age, and so on. In detail, the minimum fingerprint pitch of females is about 357 µm, and a most frequent fingerprint pitch 520 of females is about 435 µm. On the other hand, a most frequent fingerprint pitch 510 of male is about 476 µm, and the maximum fingerprint pitch of males is about 556 µm. Accordingly, in a case where a fingerprint image is obtained with the same sensing resolution, that is, the same sizes of the drive electrodes Tx and the detection electrodes Rx (or the same intervals between the drive electrodes Tx and the detection electrodes Rx), or the activated area of the channel CH, for both of males and females without considering the distribution of fingerprint pitches of males and females, the quality of a fingerprint image is degraded or unnecessary calculation processing may be performed. Thus, for more efficient and accurate process of a fingerprint image, fingerprint sensing based on consideration of the distribution of fingerprint pitches (e.g., ridge interval or valley interval) is needed.

Figure 6:
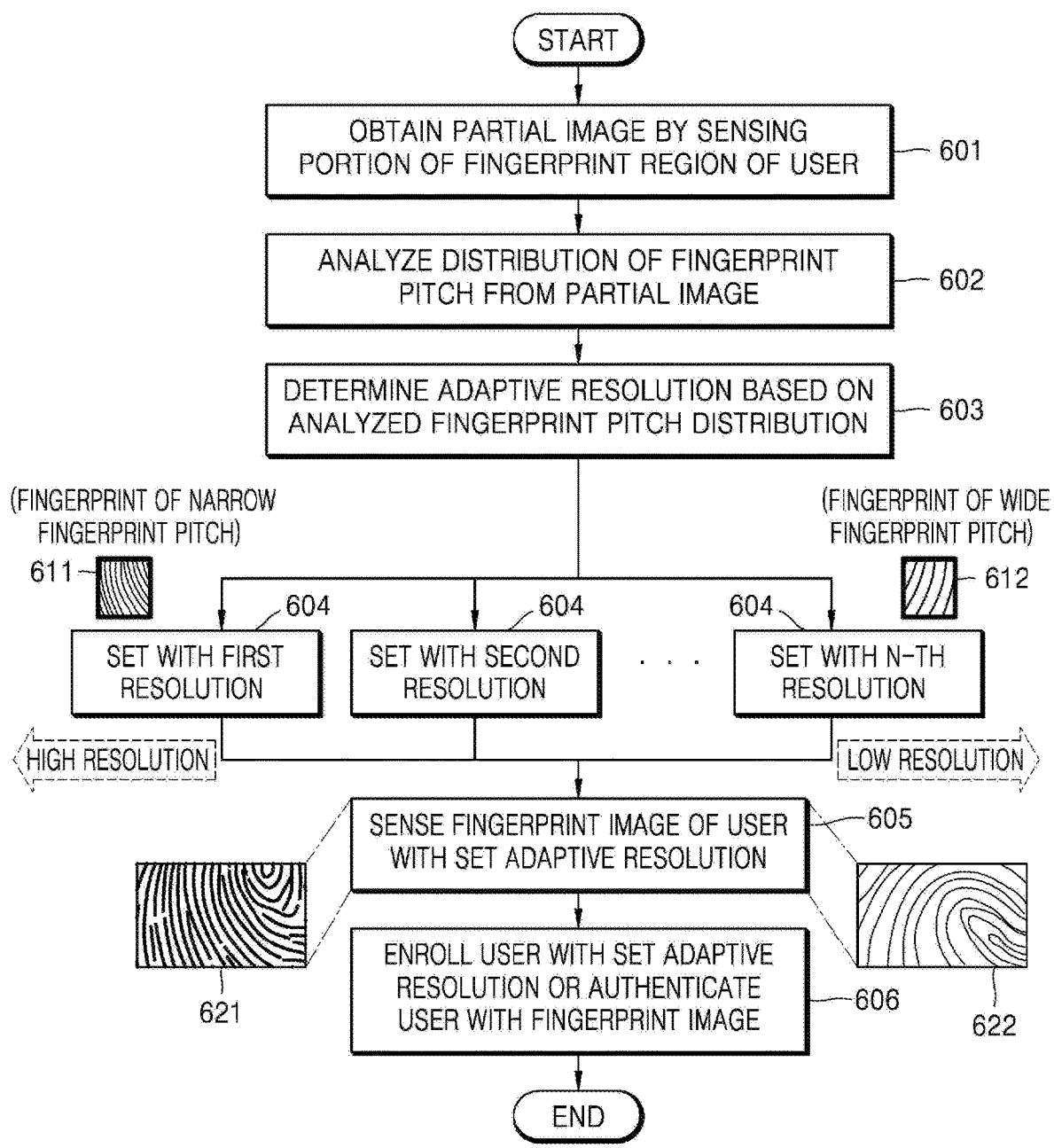
FIG. 6 is a flowchart of a method of adaptively determining a sensing resolution by considering a distribution of fingerprint pitches of a user in the fingerprint sensing system of FIG. 1, according to an example embodiment.

FIG. 6 is a flowchart of a method of adaptively determining a sensing resolution by considering the distribution of fingerprint pitches of a user in the fingerprint sensing system 10 of FIG. 1, according to an example embodiment.

In operation 601, the processor 130 obtains a partial image of a portion of a fingerprint region of a user sensed by the touch panel 100. In this state, the portion of the fingerprint region of a user may include an area including the center and periphery of the fingerprint region. However, the disclosure is not limited thereto, and the position of the fingerprint region of a user from which the fingerprint pitch may be analyzed may vary. Furthermore, the range and position of the portion of the fingerprint region to obtain a partial image may be variously changed as long as the fingerprint pitch can be analyzed.

In operation 602, the processor 130 analyzes the distribution of fingerprint pitches from the obtained partial image. The distribution of fingerprint pitches may include the distribution of ridge intervals between the ridge lines included in the fingerprint region. Alternatively, the disclosure is not limited thereto, and the distribution of fingerprint pitches may correspond to the distribution of valley intervals between the valley lines included in the fingerprint region. As a result of the analysis of the distribution of fingerprint pitches, the maximum fingerprint pitch (for example, the maximum interval between ridge lines), the most frequent fingerprint pitch (for example, a mode interval between ridge lines), the minimum fingerprint pitch (for example, the minimum interval between ridge lines), and an average fingerprint pitch (for example, an average interval between ridge lines) may be analyzed with respect to the fingerprint region of a user.

As the distribution of fingerprint pitches may intrinsically vary depending on each user, the analyzed fingerprint pitch distribution may be stored in the memory 140 by being mapped to each user.

In operation 603, the processor 130 determines an adaptive resolution at which to operate the fingerprint sensing system 10 for a user based on the size of a super-pixel corresponding to the analyzed fingerprint pitch distribution.

In this state, the processor 130 may determine to decrease the adaptive resolution when the fingerprint pitch is analyzed to be relatively large in the analyzed fingerprint pitch distribution, and to increase the adaptive resolution within a maximum sensing resolution of the fingerprint sensing system 10 when the fingerprint pitch is analyzed to be relatively small in the analyzed fingerprint pitch distribution. In the case of the graph 500 of FIG. 5, for example, when the user is a male (or the user is determined to have a larger fingerprint pitch), the processor 130 may determine the adaptive resolution such that the fingerprint sensing system 10 is operated with a sensing resolution lower than that of a female. On the other hand, when the user is a female (or the user is determined to have a smaller fingerprint pitch), the processor 130 may determine the adaptive resolution such that the fingerprint sensing system 10 is operated with a sensing resolution higher than that of a male. However, the above comparison between males and females is a mere example, and there may be a case in which a female may have a fingerprint pitch lager than that of a male. Accordingly, the processor 130 may not simply determine the adaptive resolution based on the gender or age of a user. In an example embodiment, the processor 130 may determine the adaptive resolution based on the size of the fingerprint pitch of the user.

The processor 130, when sensing a fingerprint region with respect to the analyzed fingerprint pitch distribution, determines the number of sub-pixels to maximize a difference in the amount of change in mutual capacitance between a ridge and a valley, thereby determining the size of a super-pixel. A sub-pixel is a term corresponding to a node that is described above in FIGS. 1 and 2. A super-pixel is a term denoting a sub-pixel array formed by grouping a plurality of sub-pixels, that is, a plurality of nodes.

In the case of the touch panel 100 having a high sensing resolution, the interval between the drive electrodes Tx and the interval between the detection electrodes Rx may be very narrow. The touch panel 10) of a mutual capacitance type may include cover glass, and recently, cover glass having a thickness of several hundreds of micrometers or more is used. Because the amount of change in mutual capacitance is inversely proportional to the square of the thickness of the passivation layer, when electrodes are arranged under the passivation layer having a thickness of several hundreds of micrometers or more, it may be difficult to accurately detect a difference in the amount of change in mutual capacitance by the ridge and valley of a fingerprint. Accordingly, a sensing method using a super-pixel corresponds to a method of grouping neighboring drive electrodes Tx among the drive electrodes Tx and neighboring detection electrodes Rx among the detection electrodes Rx, and sensing a fingerprint by measuring mutual capacitance in units of groups, that is, a plurality of drive electrodes and a plurality of detection electrodes.

The adaptive resolution has a correlation that is inversely proportional to the size of a super-pixel. In other words, as the number of sub-pixels (e.g., number of drive electrodes/detection electrodes) included in one group increases as the size of a super-pixel increases, the adaptive resolution decreases.

The processor 130 maps and determines an adaptive resolution for each user because the distribution of fingerprint pitches may be analyzed to be intrinsically different for each user.

In operation 604, the processor 130 sets the fingerprint sensing system 10 to the determined adaptive resolution. For example, the processor 130 sets the adaptive resolution to perform fingerprint sensing on the user with any one of a first resolution, a second resolution, . . . , an N-th resolution, where N is a natural number, within the maximum sensing resolution supported by the fingerprint sensing system 10. According to the example of FIG. 6, the sensing resolution decreases from the first resolution to the N-th resolution. Accordingly, when a fingerprint is analyzed to be a fingerprint 611 having a narrow fingerprint pitch, the processor 130 may set the fingerprint sensing system 10 with the first resolution (or high resolution), or when the fingerprint is analyzed to be a fingerprint 612 having a wide fingerprint pitch, the processor 130 may set the fingerprint sensing system 10 with the N-th resolution (or low resolution).

When the fingerprint sensing system 10 is set with the first resolution (or high resolution), a difference in the amount of change in mutual capacitance between a ridge and a valley is small. Accordingly, the processor 130 may increase a value of integration, which is a parameter for fingerprint processing, so that the difference in the amount of change in mutual capacitance is increased, whereas a fingerprint processing speed may be rather deceased. On the other hand, when the fingerprint sensing system 10 is set with the N-th resolution (or low resolution), as a difference in the amount of change in mutual capacitance is large, the processor 130 may set the value of integration parameter to be lower to increase the fingerprint processing speed.

In operation 605, the processor 130 obtains a fingerprint image of a user for the fingerprint region of a user sensed by using the fingerprint sensing system 10 operated with the set adaptive resolution. Unlike the operation 601 in which only a portion of the fingerprint region of a user is sensed in the analysis of the distribution of fingerprint pitches, in operation 605, the entire fingerprint region of a user may be sensed.

For example, when the set adaptive resolution is the first resolution (or high resolution), a fingerprint image 621 having a narrow fingerprint pitch may be obtained, and when the set adaptive resolution is the N-th resolution (or low resolution), a fingerprint image 622 having a wide fingerprint pitch may be obtained.

In operation 606, the processor 130 may enroll the user with the obtained fingerprint image, and/or authenticate the user with the obtained fingerprint image. For example, the processor 130 may register the obtained fingerprint image of the user, and/or authenticate the user based on a comparison of the registered fingerprint image of the user and a currently obtained fingerprint image.

Figure 7:
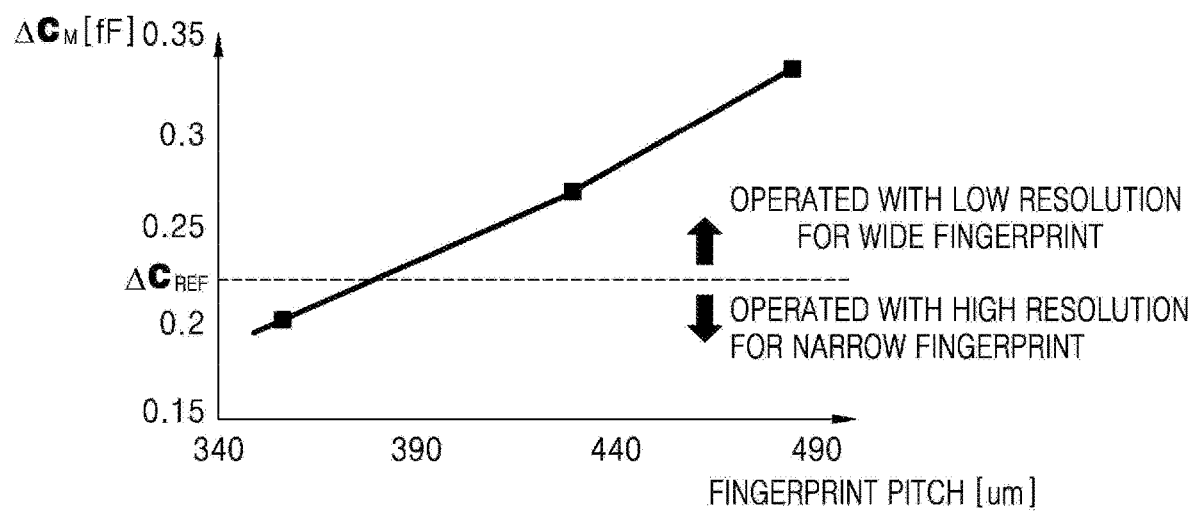
FIG. 7 is a graph for describing a method of determining an adaptive resolution by considering a fingerprint pitch and a difference $\Delta C_M$ in an amount of change in mutual capacitance between a ridge and a valley, according to an example embodiment.

FIG. 7 is a graph for describing a method of determining an adaptive resolution by considering a difference $\Delta C_M$ in the amount of change in mutual capacitance between a ridge and a valley and a fingerprint pitch, according to an example embodiment.

Referring to FIG. 7, the processor 130 may set a reference difference $\Delta C_{REF}$ in the amount of change in mutual capacitance to a certain value as a reference for changing a sensing resolution. In detail, when the difference $\Delta C_M$ in the amount of change in mutual capacitance corresponding to the analyzed fingerprint pitch exceeds the reference difference $\Delta C_{REF}$ in the change amount (that is, the analyzed fingerprint pitch is wide), the processor 130 may determine an adaptive resolution to be a relatively low sensing resolution (that is, to decrease the sensing resolution), and when the difference $\Delta C_M$ in the amount of change in mutual capacitance corresponding to the analyzed fingerprint pitch is less than the reference difference $\Delta C_{REF}$ in the change amount (that is, the analyzed fingerprint pitch is narrow), the processor 130 may determine the adaptive resolution to be a relatively high sensing resolution (that is, to increase the sensing resolution).

The difference $\Delta C_M$ in the amount of change in mutual capacitance and the reference difference $\Delta C_{REF}$ in the change amount may denote a difference in the change amount with respect to a sub-pixel, or a difference in the change amount with respect to a super-pixel including a plurality of sub-pixels.

In other words, to determine an adaptive resolution corresponding to the analyzed fingerprint pitch distribution, the processor 130 may determine the adaptive resolution by considering both the size of a super-pixel and the difference $\Delta C_M$ in the amount of change in mutual capacitance at the super-pixel.

Figure 8:
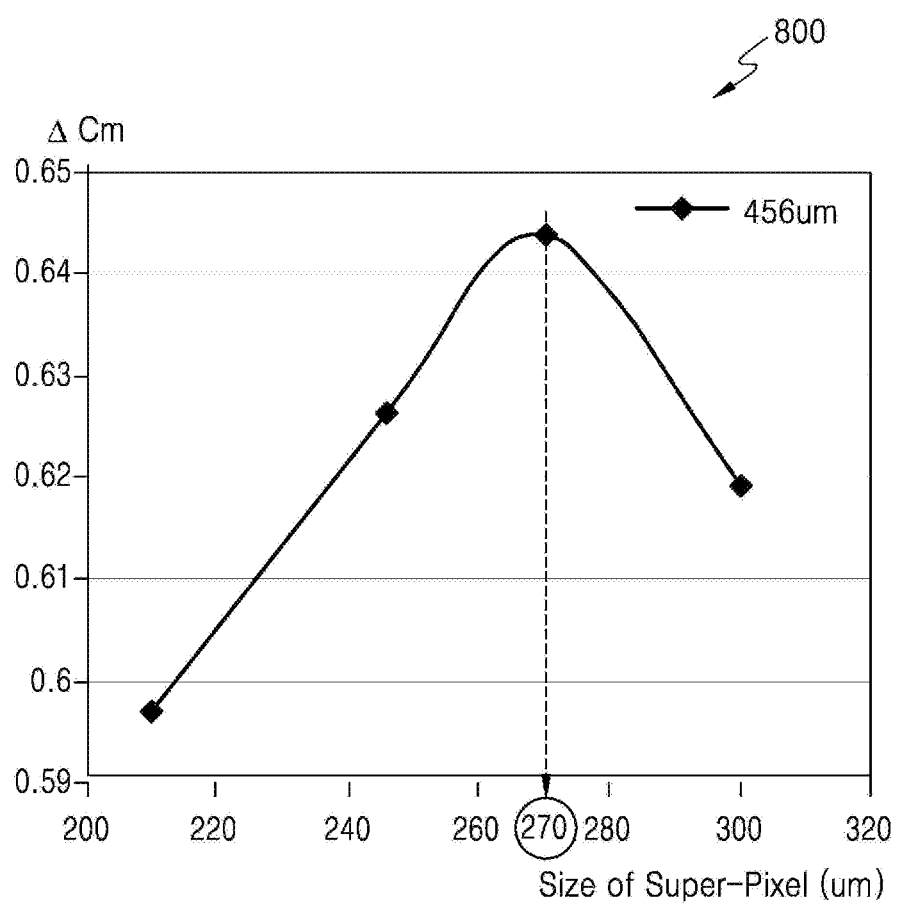
FIG. 8 is a graph showing a difference $\Delta C_M$ in the amount of change in mutual capacitance according to a size of a super-pixel, according to an example embodiment.

FIG. 8 is a graph showing a difference $\Delta C_M$ in the amount of change in mutual capacitance according to the size of a super-pixel, according to an example embodiment.

Referring to FIGS. 7-8, the processor 130 may determine the adaptive resolution by considering both the size of a super-pixel and the difference $\Delta C_M$ in the amount of change in mutual capacitance between a ridge and a valley at the super-pixel.

As shown in a graph 800 of FIG. 8, when the size of a super-pixel is greater than a certain threshold size, for example, 270 μm, with respect to a fingerprint having a fingerprint pitch of 456 μm, the difference $\Delta C_M$ in the amount of change in mutual capacitance, that is, a sampling rate, may be rather reduced. Accordingly, to determine the adaptive resolution, the processor 130 may determine the size of a super-pixel corresponding to a maximum of the difference $\Delta C_M$ in the amount of change in mutual capacitance by considering a correlation between the difference $\Delta C_M$ in the amount of change in mutual capacitance and the size of a super-pixel.

Figure 9:
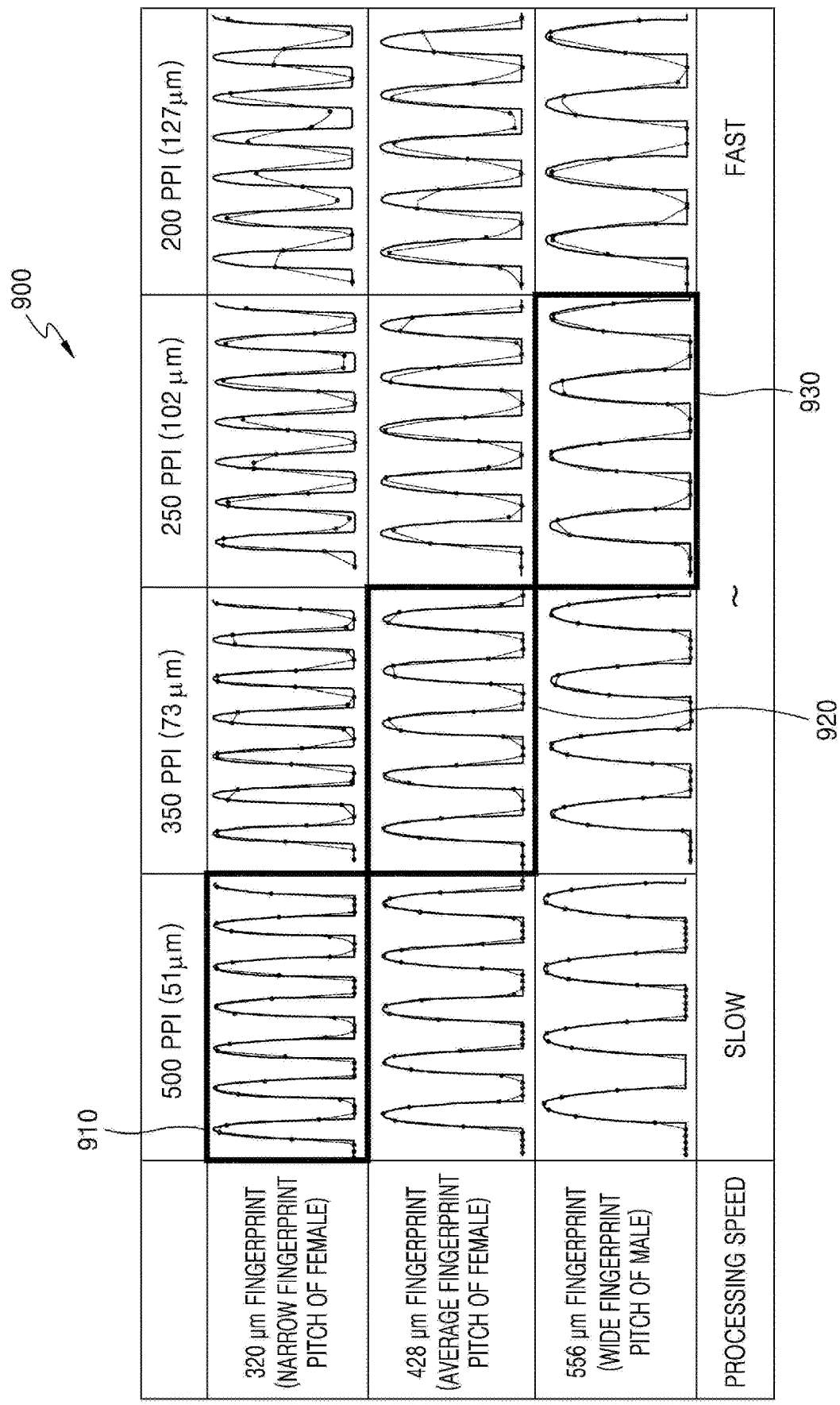
FIG. 9 illustrates a method of determining an adaptive resolution according to a distribution of fingerprint pitches, according to an example embodiment.

FIG. 9 illustrates a method of determining an adaptive resolution according to the distribution of fingerprint pitches, according to an example embodiment.

Referring to FIG. 9, as a result 900 of the analysis of an example distribution of fingerprint pitches, a fingerprint having a fingerprint pitch of 320 μm (or a narrow fingerprint pitch of a female), a fingerprint having a fingerprint pitch of 428 μm (or an average fingerprint pitch of a female), and a fingerprint having a fingerprint pitch of 556 μm (or a wide fingerprint pitch of a male) are illustrated. In all cases, when a sensing resolution is the highest, that is, 500 pixels per inch (PPI) (or 51 μm of a pixel), sensing accuracy may be the highest. However, when the sensing resolution is the highest, that is, 500 PPI (or 51 μm of a pixel), the processing speed of the processor 130 is the slowest. This is because the processor 130 needs to increase a parameter for fingerprint processing (e.g., a value of integration), and increase the processing amount of output voltage (gain) data. Accordingly, the processor 130 may determine an optimal adaptive resolution by considering both the sensing accuracy and the processing speed.

First, according to a result of the fingerprint sensing with 500 PPI (or 51 μm of a pixel), 350 PPI (73 μm of a pixel), 250 PPI (102 μm of a pixel), and 200 PPI (127 μm of a pixel) with respect to a fingerprint having a fingerprint pitch of 320 μm (or a narrow fingerprint pitch of a female), it may be seen that fingerprint sensing accuracy sharply decreases as the sensing resolution decreases. Accordingly, the processor 130 may determine 500 PPI (51 μm) to be an adaptive resolution 910 by considering the fingerprint sensing accuracy.

Next, according to a result of the fingerprint sensing with 500 PPI (51 μm), 350 PPI (73 μm), 250 PPI (102 μm), and 200 PPI (127 μm) with respect to a fingerprint having a fingerprint pitch of 428 μm (or an average fingerprint pitch of a female), fingerprint sensing accuracy slightly decreases as the sensing resolution slightly decreases. However, although the sensing resolution slightly decreases, the processing speed of the processor 130 increases, and thus the processor 130 may determine 350 PPI (73 μm) to be an adaptive resolution 920.

Finally, according to a result of the fingerprint sensing with 500 PPI (51 μm), 350 PPI (73 μm), 250 PPI (102 μm), and 200 PPI (127 μm) with respect to a fingerprint having a fingerprint pitch of 556 μm (or a wide fingerprint pitch of a male), although the sensing resolution decreases relatively much, the fingerprint sensing accuracy does not decrease much. Accordingly, the processor 130 may determine 250 PPI (102 μm) to be an adaptive resolution 930 by considering the processing speed.

The processor 130 may determine an optimal adaptive resolution to most efficiently obtain an optimal fingerprint image by using the methods described in FIG. 9, that is, by considering the fingerprint sensing accuracy and the processing speed of the processor 130.

Figure 10:
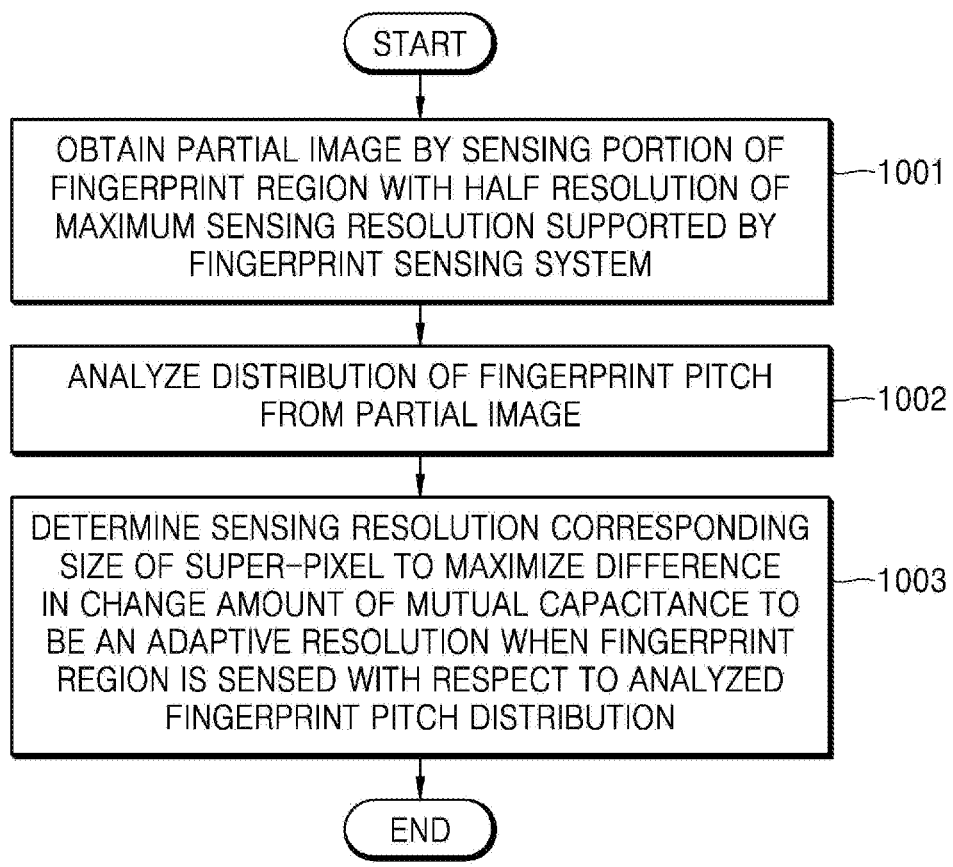
FIG. 10 is a flowchart of an example of a method of determining an adaptive resolution by obtaining a partial image, according to an example embodiment.

FIG. 10 is a flowchart of an example of a method of determining an adaptive resolution by obtaining a partial image according to an example embodiment.

In operation 1001, the processor 130 obtains a partial image by sensing a portion of the fingerprint region with a lower resolution, for example but not limited to, a half resolution of the maximum sensing resolution supported by the fingerprint sensing system 10. In other words, to obtain a partial image, the fingerprint sensing system 10 may perform fingerprint sensing with a lower resolution, e.g., a half resolution of the maximum sensing resolution of the fingerprint sensing system 10, instead of sensing with the maximum sensing resolution, with respect to a portion of the fingerprint region, thereby obtaining the partial image at a faster processing speed.

In operation 1002, the processor 130 analyzes the distribution of fingerprint pitches from the partial image.

In operation 1003, when sensing the fingerprint region with respect to the analyzed fingerprint pitch distribution, the processor 130 determines an adaptive resolution corresponding to the size of a super-pixel to maximize a change of mutual capacitance, that is, the difference $\Delta C_M$ in the amount of change in mutual capacitance between a ridge and a valley, and adjust the sensing resolution to the adaptive resolution.

Figure 11:
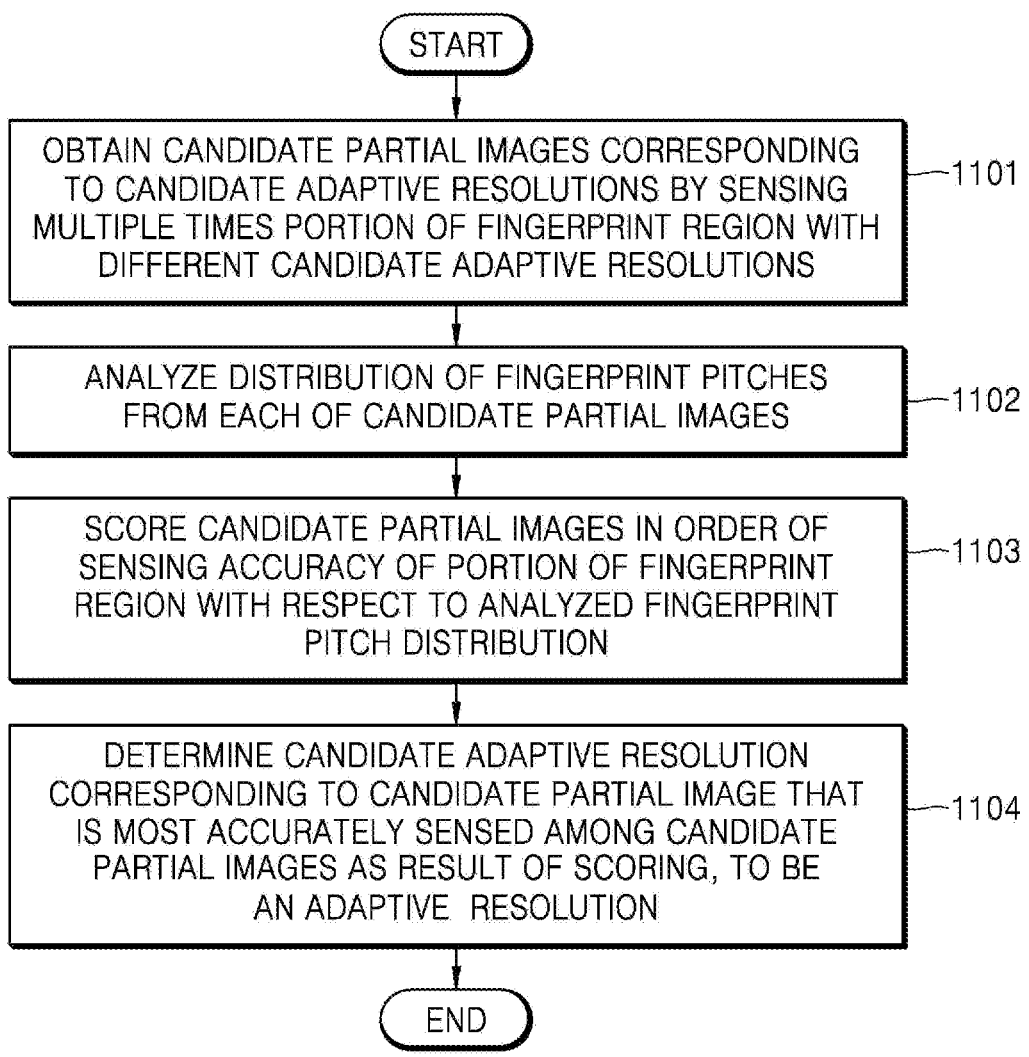
FIG. 11 is a flowchart of another example of a method of determining an adaptive resolution by obtaining a partial image, according to an example embodiment.

FIG. 11 is a flowchart of another example of a method of determining an adaptive resolution by obtaining a partial image according to an example embodiment. According to the method of determining an adaptive resolution in FIG. 11, the partial image is obtained by a different method from that of FIG. 10.

In operation 1101, the processor 130 obtains candidate partial images corresponding to a plurality of candidate adaptive resolutions obtained by sensing multiple times a portion of the fingerprint region with the plurality of different candidate adaptive resolutions.

In operation 1102, the processor 130 analyzes the distribution of fingerprint pitches from each of the candidate partial images.

In operation 1103, the processor 130 scores (or sorts) the candidate partial images in order of an accuracy in sensing the portion of the fingerprint region with respect to the analyzed fingerprint pitch distribution.

In operation 1104, the processor 130 determines, from a result of scoring (or sorting), a candidate adaptive resolution corresponding to a candidate partial image that is most accurately sensed among the candidate partial images, to be an adaptive resolution. The processor 130 may adjust the sensing resolution to the adaptive resolution.

The methods described in FIGS. 10 and 11 are merely examples, and the method of determining an adaptive resolution by obtaining a partial image according to example embodiments is not limited thereto. Accordingly, in addition to the above-described methods of FIGS. 10 and 11, a variety of methods may be performed to obtain one or more partial images, analyze the distribution of fingerprint pitches in the one or more partial images, and determine an adaptive resolution.

Figure 12A:
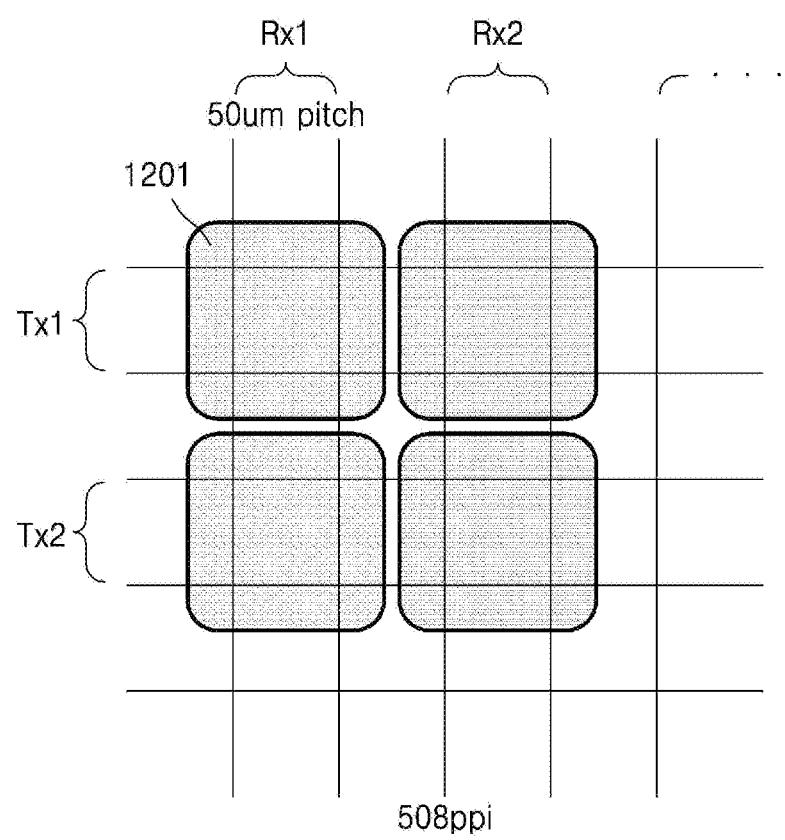
FIGS. 12A, 12B, and 12C illustrate cases in which a touch panel is operated at different adaptive resolutions, according to example embodiments.
Figure 12B:
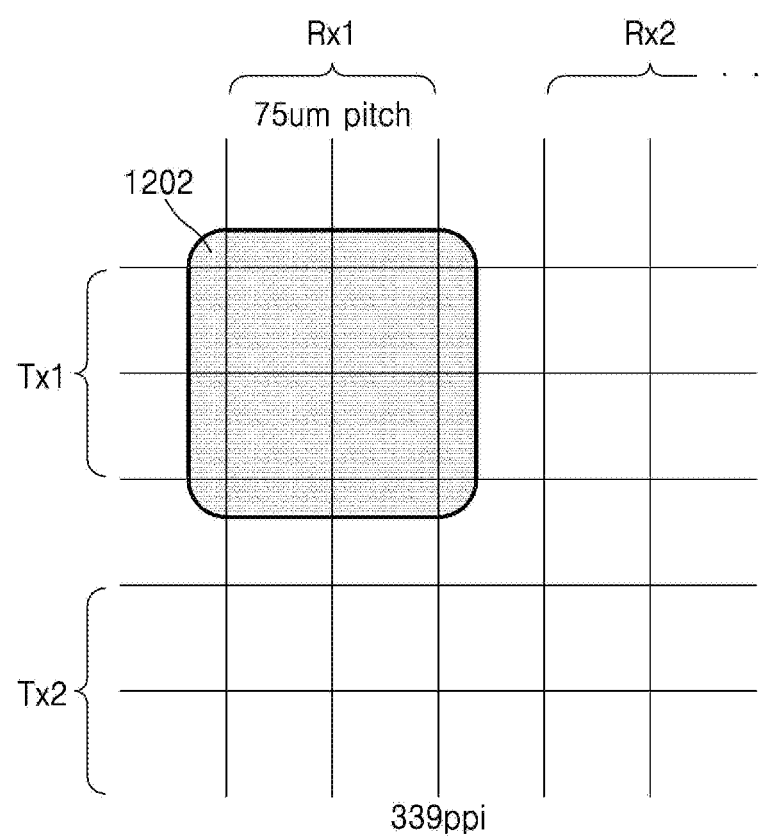
Figure 12C:
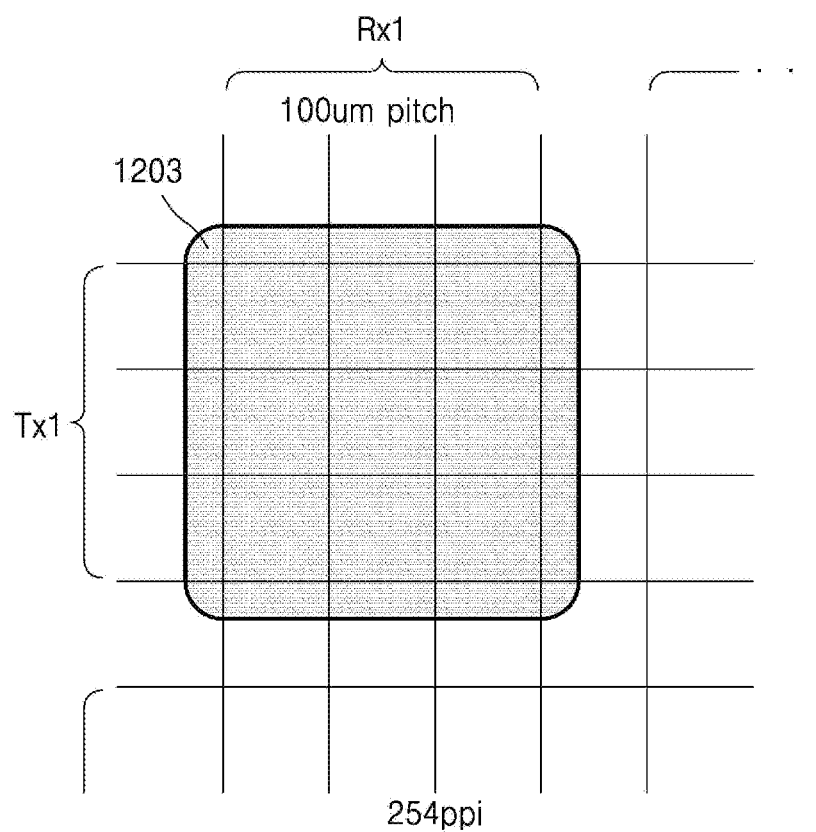

FIGS. 12A, 12B, and 12C illustrate cases in which a touch panel is operated at different adaptive resolutions, according to example embodiments.

Referring to FIGS. 12A to 12C, for illustrative purposes, it is assumed that the maximum sensing resolution supported by the touch panel 100 is 1016 PPI and a pitch (or a size of a pixel) is 25 μm.

Referring to FIG. 12A, as a result of the analysis of the distribution of fingerprint pitches, the processor 130 may determine that a super-pixel 1201 has a 50 μm pitch (=25 μm×2). Accordingly, the size of the super-pixel 1201 corresponds to a 2×2 sub-pixel array. In other words, the super-pixel 1201 may be a group of two drive electrodes Tx1 and two detection electrodes Rx1. Accordingly, the processor 130 may determine an adaptive resolution corresponding to the super-pixel 1201 to be 508 PPI (=1016 PPI/2).

Referring to FIG. 12B, as a result of the analysis of the distribution of fingerprint pitches, the processor 130 may determine the size of a super-pixel 1202 to be 75 μm pitch (=25 μm×3). Accordingly, the size of the super-pixel 1202 corresponds to a 3×3 sub-pixel array. In other words, the super-pixel 1202 may be a group of three drive electrodes Tx1 and three detection electrodes Rx1. Accordingly, the processor 130 may determine an adaptive resolution corresponding to the super-pixel 1202 to be 339 PPI (≈1016 PPI/3).

Referring to FIG. 12C, as a result of the analysis of the distribution of fingerprint pitches, the processor 130 may determine the size of a super-pixel 1203 to be 100 μm pitch (=25 μm×4). Accordingly, the size of the super-pixel 1203 corresponds to a 4×4 sub-pixel array. In other words, the super-pixel 1203 may be a group of four drive electrodes Tx1 and four detection electrodes Rx1. Accordingly, the processor 130 may determine an adaptive resolution corresponding to the super-pixel 1203 to be 254 PPI (=1016 PPI/4).

Similarly to the methods described in FIGS. 12A to 12C, the drive electrodes Tx and the detection electrodes Rx of the touch panel 100 may be grouped to constitute a super-pixel of a various size, and the processor 130 may more efficiently perform fingerprint sensing at a resolution that is optimized for each user by obtaining a fingerprint image sensed by using a super-pixel grouped based on the result of the analysis of the distribution of fingerprint pitches.

Figure 13:
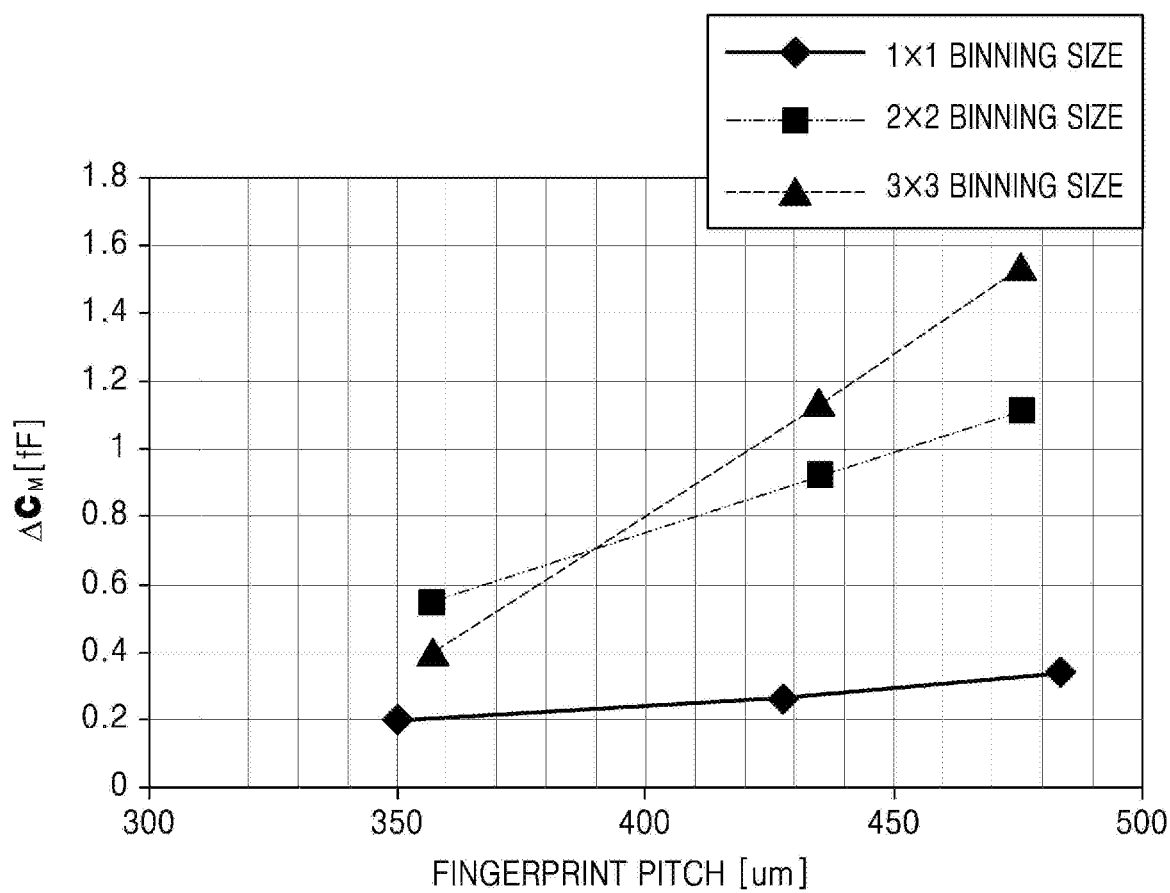
FIG. 13 is a graph showing a relation between the size of a super-pixel and a binning size, according to an example embodiment.

FIG. 13 is a graph showing a relation between the size of a super-pixel and a binning size, according to an example embodiment.

Referring to FIG. 13, with a sensing resolution of 254 PPI, a relationship between the difference $\Delta C_M$ in the amount of change in mutual capacitance between a ridge and a valley and the fingerprint pitch in different binning sizes is shown.

When a fingerprint pitch of a fingerprint is small (e.g., minimum fingerprint pitch of a female, for example, 356 μm), when the binning size is large, a blurred fingerprint image may be obtained. In other words, as illustrated in FIG. 13, it may be seen that the difference $\Delta C_M$ in the amount of change in mutual capacitance is greater in a 2×2 binning size than in a 3×3 binning size. On the other hand, when a fingerprint pitch is increased over 390 μm, when the size of a binning size is large, that is, a 3×3 binning size, it may be seen that a fingerprint image of a higher sensitivity maybe obtained than in a 2×2 binning size.

Accordingly, the processor 130 may more efficiently obtain an optimized fingerprint image by adjusting the binning size with the above-described determination of an adaptive resolution.

Figure 14A:
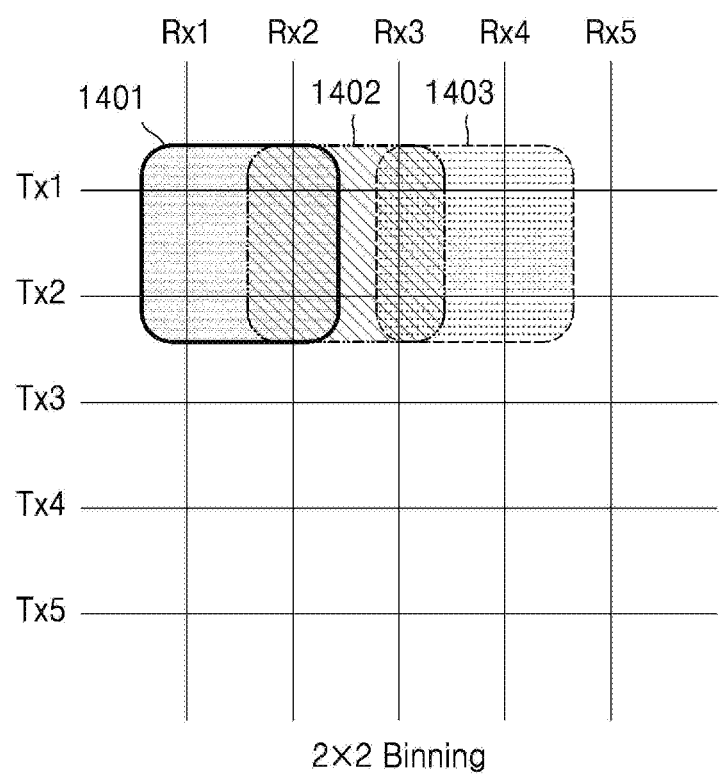
FIGS. 14A and 14B illustrate examples of changing only a binning size without adjusting a resolution, according to example embodiments.
Figure 14B:
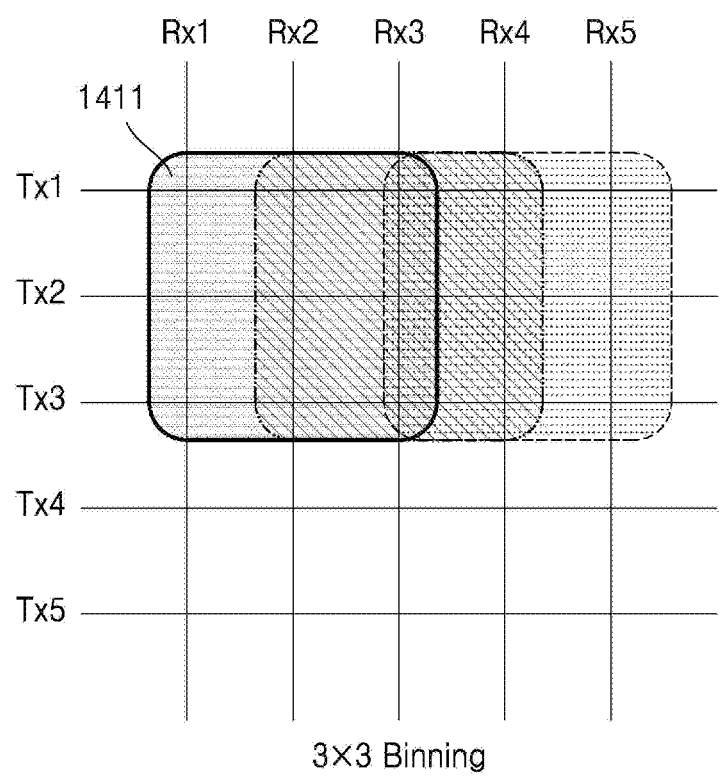

FIGS. 14A and 14B illustrate examples of changing only a binning size without adjusting a resolution, according to example embodiments.

Referring to FIG. 14A, the processor 130 may determine, based on the analyzed fingerprint pitch distribution, a binning size to be a sub-pixel array of 2×2, which is optimized for the corresponding fingerprint pitch. Accordingly, a bin 1401 may be a group including two drive electrodes Tx1 and Tx2 and two detection electrodes Rx1 and Rx2. Bins 1402 and 1403 may be grouped in an electrode array having the same size at neighboring positions spaced by one electrode.

Referring to FIG. 14B, the processor 130 may determine, based on the analyzed fingerprint pitch distribution, a binning size to be a sub-pixel array of 3×3, which is optimized for the corresponding fingerprint pitch. Accordingly, a bin 1411 may be a group including three drive electrodes Tx1, Tx2, and Tx3 and three detection electrodes Rx1, Rx2, and Rx3.

FIG. 15 illustrates a case in which both the adaptive resolution and the binning size are adjusted, according to an example embodiment.

Referring to FIG. 15, in the fingerprint sensing system 10 having a 1016 PPI sensing resolution, examples of the size of a super-pixel, that is, a pitch, for each of cases in which the adaptive resolution and the binning size are adjusted are described.

In summary of the above descriptions in FIGS. 8 and 13, an optimal fingerprint image may be obtained by determining both the adaptive resolution and the binning size based on the size of a super-pixel, that is, a pitch, to maximize the difference $\Delta C_M$ in the amount of change in mutual capacitance between a ridge and a valley, and by performing fingerprint sensing by using the adaptive resolution and the binning size determined as above.

In an example embodiment, after an adaptive resolution is determined according to the method described in FIG. 8, the processor 130 may additionally determine the binning size of the fingerprint sensing system 10 based on the size of a super-pixel, that is, a pitch, to maximize the difference $\Delta C_M$ in the amount of change in mutual capacitance when the adaptive resolution and the binning size are simultaneously adjusted. Then, the processor 130 obtains a fingerprint image by setting the fingerprint sensing system 10 based on the previously determined adaptive resolution and the additionally determined binning size.

Figure 16A:
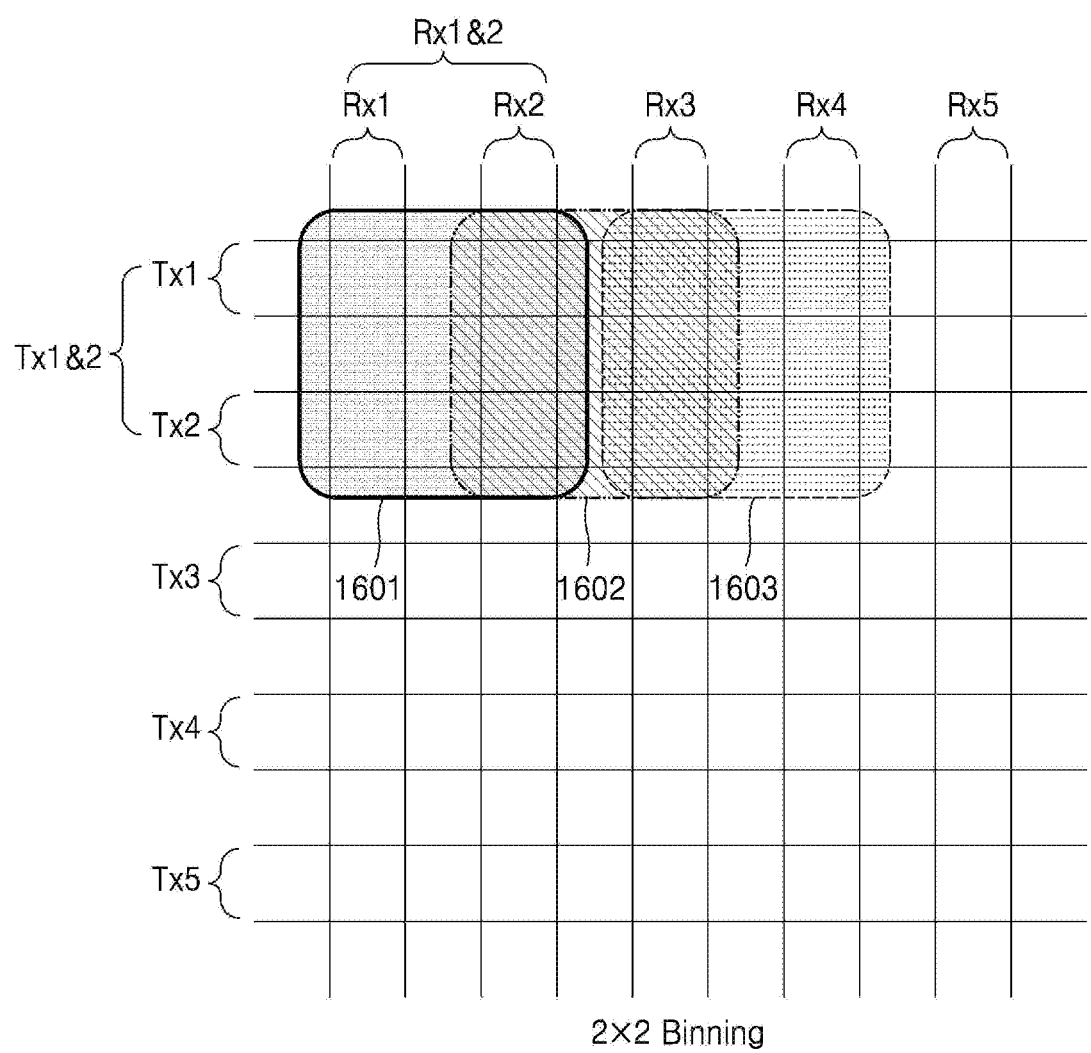
FIGS. 16A, 16B, and 16C illustrate examples of simultaneously changing an adaptive resolution and a binning size, according to example embodiments.
Figure 16B:
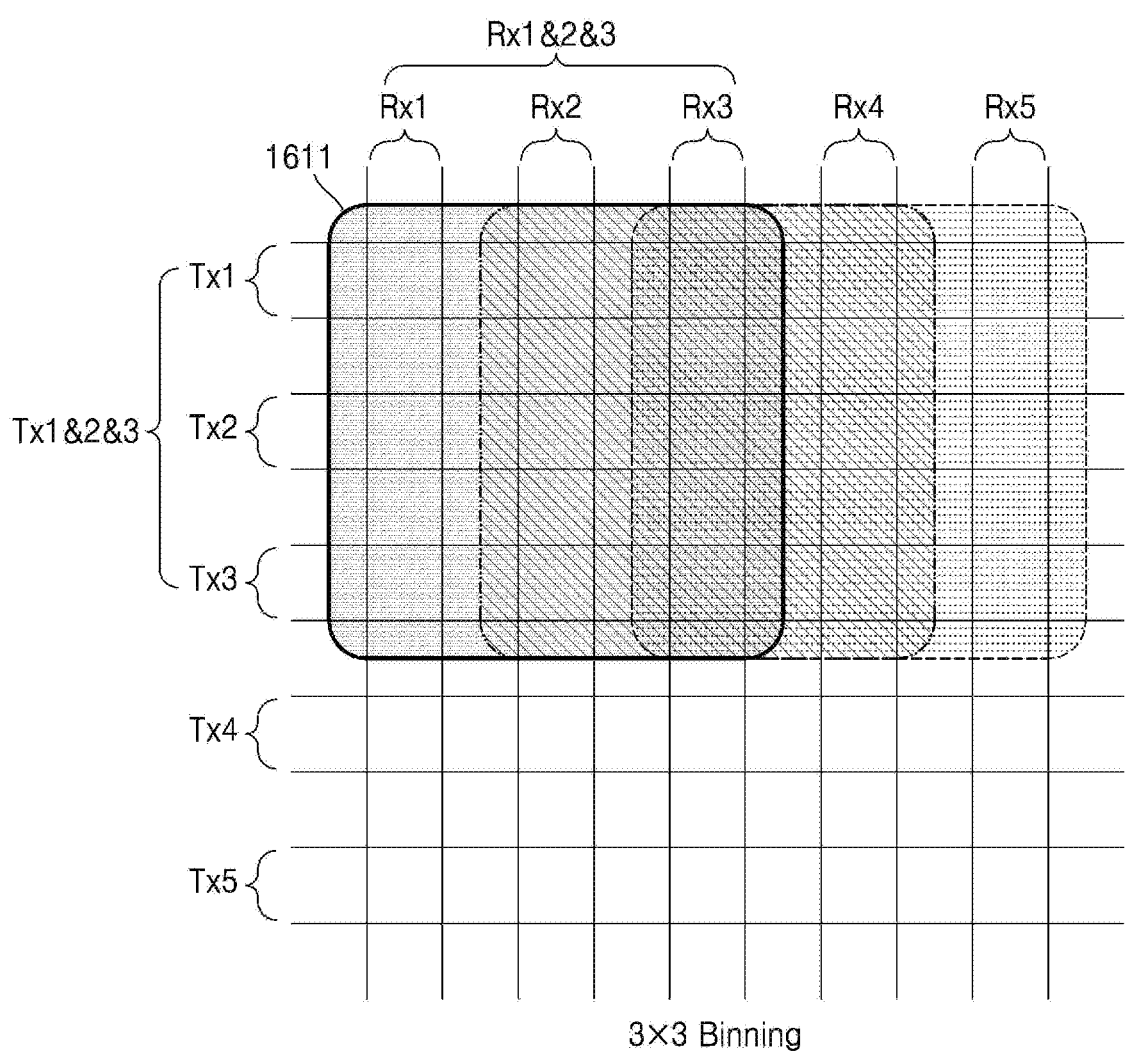
Figure 16C:
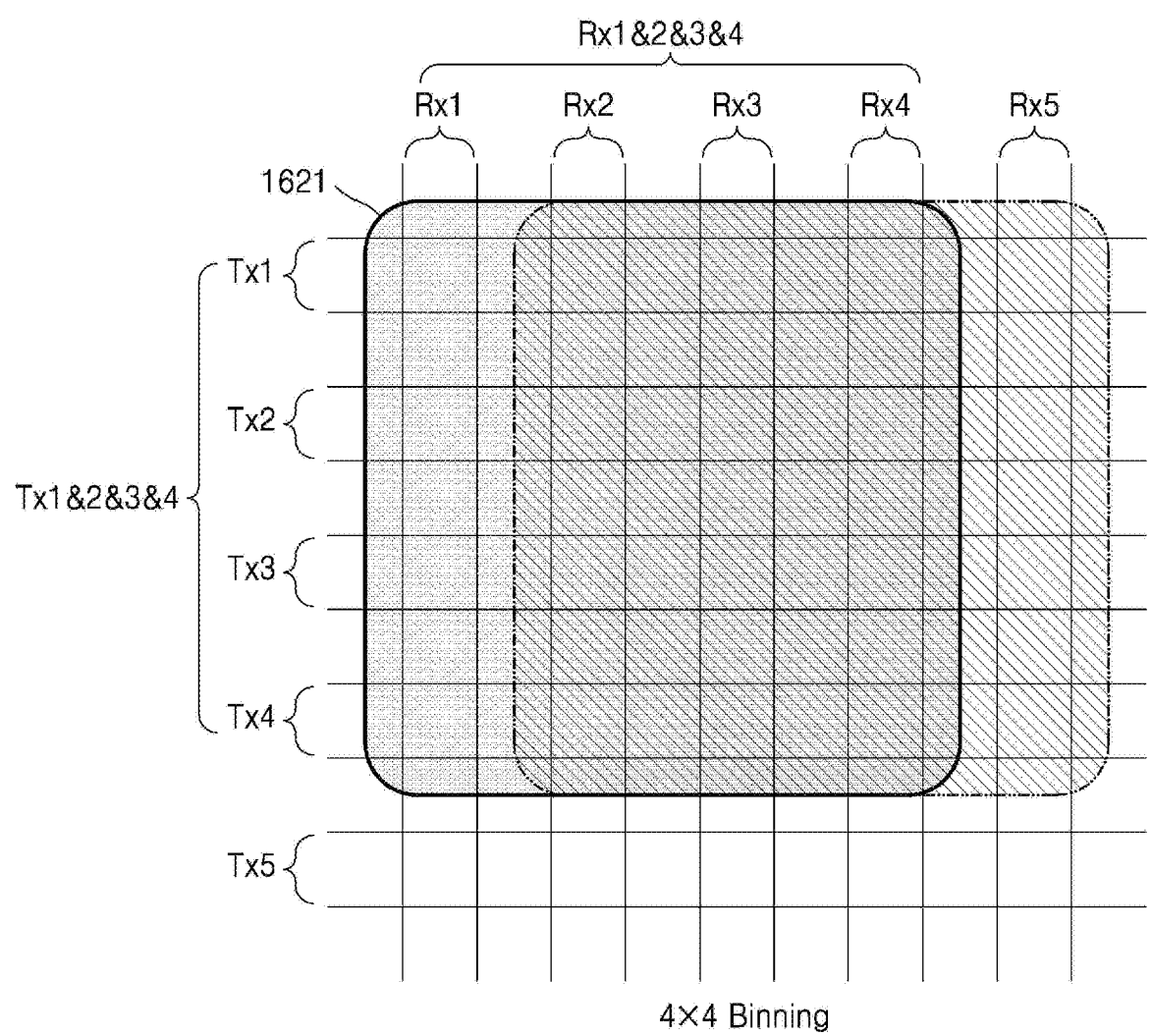

FIGS. 16A to 16C illustrate examples of simultaneously changing the adaptive resolution and the binning size, according to example embodiments.

Referring to FIGS. 16A to 16C, in the fingerprint sensing system 10 having a 1016 PPI resolution of a 25 μm pitch (or a size of a sub-pixel), cases of operating with various binning sizes at a setting of a 508 PPI adaptive resolution are described.

Referring to FIG. 16A, the processor 130 may determine the size of a super-pixel for determining an adaptive resolution to be 2×2, that is, a 50 μm (=25 μm×2) pitch, and the binning size to be 2×2, based on the analyzed fingerprint pitch distribution. In other words, one super-pixel for the determination of an adaptive resolution may be a group of two drive electrodes Tx1 and two detection electrodes Rx1, and one super-pixel corresponds to a unit bin in the binning size. Because the binning size is 2×2, a bin 1601 for fingerprint sensing may be constituted by grouping 2×2 super-pixels corresponding to a drive electrode group Tx1&2 including four drive electrodes Tx1 and Tx2 and a detection electrode group Rx1&2 including four detection electrodes Rx1 and Rx2. Bins 1602 and 1603 may be also constituted at neighboring positions spaced by the size of one super-pixel.

Referring to FIG. 16B, the processor 130 may determine the size of a super-pixel for determining an adaptive resolution to be 2×2, that is, 50 μm (=25 μm×2) pitch, and the binning size to be 3×3, based on the analyzed fingerprint pitch distribution. A bin 1611 for fingerprint sensing may be constituted by grouping 3×3 super-pixels corresponding to a drive electrode group Tx1&2&3 including six drive electrodes Tx1, Tx2, and Tx3 and a detection electrode group Rx1&2&3 including six detection electrodes Rx1, Rx2, and Rx3.

Referring to FIG. 16C, the processor 130 may determine the size of a super-pixel for determining an adaptive resolution to be 2×2, that is, 50 μm (=25 μm×2) pitch, and the binning size to be 4×4, based on the analyzed fingerprint pitch distribution. A bin 1621 for fingerprint sensing may be constituted by grouping 4×4 super-pixels corresponding to a drive electrode group Tx1&2&3&4 including eight drive electrodes Tx1, Tx2, Tx3, and Tx4 and a detection electrode group Rx1&2&3&4 including eight detection electrodes Rx1, Rx2, Rx3, and Rx4.

In addition to the illustrations of FIGS. 16A to 16C, the fingerprint sensing system 10 may be operated with various sizes of super-pixels, that is, various adaptive resolutions and various binning sizes.

FIG. 17 is a flowchart of a method of operating a fingerprint sensing system, according to an example embodiment.

Referring to FIG. 17, the method of operating a fingerprint sensing system according to an example embodiment may include operations of the fingerprint sensing system 10 described above. Accordingly, the contents described above, but omitted in the following description, may be applied to the method of FIG. 17. For example, the operations of the fingerprint sensing system 10 may be operations that are time-serially processed, but the disclosure is not limited thereto.

In operation 1701, the processor 130 obtains a partial image by sensing a portion of the fingerprint region of a user.

In operation 1702, the processor 130 analyzes the distribution of fingerprint pitches from the obtained partial image. The processor 130 may output at least one of, for example, the maximum fingerprint pitch, the most frequent fingerprint pitch, the minimum fingerprint pitch, and an average fingerprint pitch, with respect to the user, as a result of the analysis of the distribution of fingerprint pitches.

In operation 1703, the processor 130 determines an adaptive resolution at which to operate the fingerprint sensing system 10 with respect to the user based on the size of a super-pixel corresponding to the analyzed fingerprint pitch distribution.

In operation 1704, the processor 130 sets the fingerprint sensing system 10 to the determined adaptive resolution.

In operation 1705, the processor 130 obtains a fingerprint image of the user with respect to the fingerprint region sensed by using the fingerprint sensing system 10 operated to the determined adaptive resolution.

It should be noted that, for ease of description, the foregoing method embodiments are expressed as a series of actions. However, persons skilled in the art should appreciate that the disclosure is not limited to the described action sequence, because according to the disclosure, some operations may be performed in other sequences or performed simultaneously. In addition, a person skilled in the art should also understand that the embodiments described in this specification all belong to exemplary embodiments, and the involved actions and modules are not necessarily mandatory to the disclosure.

The example embodiments may be embodied as a computer readable storage medium including instruction codes executable by a computer (or a processor or a processing unit). A computer readable storage medium may be any usable medium which can be accessed by the computer and includes any type of a volatile/non-volatile and/or removable/non-removable medium. Further, the computer readable storage medium may include any type of a computer storage and communication medium. The computer readable storage medium includes any type of a volatile/non-volatile and/or removable/non-removable medium, embodied by a certain method or technology for storing information such as computer readable instruction code, a data structure, a program module or other data. The communication medium may include the computer readable instruction code, the data structure, the program module, or other data of a modulated data signal such as a carrier wave, or other transmission mechanism, and includes any information transmission medium.

Examples of the computer readable recording medium include, for example but not limited to, a read-only memory (ROM), a random-access memory (RAM), a universal serial bus (USB), a compact disc (CD)-ROM, a digital versatile disc (DVD), a magnetic tape, a floppy disk, and an optical data storage device. In addition, the computer readable storage media may be distributed into the computer system that is connected through the networks to store and implement the computer readable codes in a distributed computing mechanism.

At least one of the components, elements, modules or units described herein may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in some of block diagrams, communication between the components, elements or units may be performed through the bus. Functional aspects of the above exemplary embodiments may be implemented in algorithms that execute on one or more processors. Furthermore, the components, elements or units represented by a block or processing operations may employ any number of related art techniques for electronics configuration, signal processing and/or control, data processing and the like.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A method of operating a fingerprint sensing system, the method comprising:
    obtaining a partial image sensed with respect to a portion of a fingerprint region of a user;
    analyzing a distribution of fingerprint pitches from the obtained partial image;
    determining an adaptive resolution at which to operate the fingerprint sensing system with respect to the user, based on a size of a super-pixel corresponding to the analyzed distribution of fingerprint pitches;
    setting the fingerprint sensing system to the determined adaptive resolution; and
    obtaining a fingerprint image of the user with respect to the fingerprint region sensed by using the fingerprint sensing system operated at the determined adaptive resolution.

2. The method of claim 1, wherein the distribution of fingerprint pitches comprises a distribution of ridge intervals between ridge lines included in the fingerprint region.

3. The method of claim 1, wherein the analyzing of the distribution of fingerprint pitches comprises analyzing at least one of a maximum fingerprint pitch, a most frequent fingerprint pitch, a minimum fingerprint pitch, and an average fingerprint pitch, with respect to the user.

4. The method of claim 1, wherein the determining of the adaptive resolution comprises determining the adaptive resolution is to be decreased when a fingerprint pitch is analyzed to be relatively large in the analyzed distribution, and determining the adaptive resolution is to be increased when a fingerprint pitch is analyzed to be relatively small in the analyzed distribution, within a maximum sensing resolution supported by the fingerprint sensing system.

5. The method of claim 4, wherein the determining of the distribution of fingerprint pitches comprises determining the size of a super-pixel by determining the number of sub-pixels to maximize a difference in an amount of change in mutual capacitance between a ridge and a valley when the fingerprint region is sensed, and the determined adaptive resolution is inversely proportional to the determined size of a super-pixel.

6. The method of claim 1, wherein the obtaining of the partial image comprises obtaining the partial image sensed with respect to the portion of the fingerprint region with a half resolution of the maximum sensing resolution supported by the fingerprint sensing system, and
    the determining of the distribution of fingerprint pitches comprises determining a sensing resolution corresponding to the size of a super-pixel to maximize a difference in an amount of change in mutual capacitance between a ridge and a valley when the fingerprint region is sensed.

7. The method of claim 1, wherein the obtaining of the partial image comprises obtaining candidate partial images corresponding to candidate adaptive resolutions obtained by sensing multiple times the portion of the fingerprint region with a plurality of different candidate adaptive resolutions, and
    the determining of the distribution of fingerprint pitches comprises:
    scoring the candidate partial images in order of sensing accuracy of the portion of the fingerprint region with respect to the analyzed distribution; and
    determining a candidate adaptive resolution corresponding to a candidate partial image that is most accurately sensed among the candidate partial images as a result of the scoring, to be the adaptive resolution.

8. The method of claim 1, further comprising determining a binning size of the fingerprint sensing system corresponding to the analyzed distribution,
    wherein the obtaining of the fingerprint image comprises obtaining the fingerprint image based on the determined adaptive resolution and the determined binning size.

9. The method of claim 8, wherein the super-pixel corresponds to a unit bin in the determined binning size.

10. The method of claim 1, wherein the determined adaptive resolution is mapped and determined for each user.

11. The method of claim 1, wherein the obtaining of the fingerprint image is performed to allow the user to enroll the fingerprint image in the fingerprint sensing system, or to authenticate the user by using the fingerprint sensing system.

12. A non-transitory computer-readable recording medium having recorded thereon a program executable by at least one processor to perform the method according to claim 1.

13. A fingerprint sensing system comprising:
    at least one processor performing reading and operating, based on instructions in a computer program; and
    at least one memory storing at least a portion of the computer program for access by the at least one of processor,
    wherein the at least one of processor is configured to:
    obtain a partial image sensed with respect to a portion of a fingerprint region of a user;
    analyze a distribution of fingerprint pitches from the obtained partial image;
    determine an adaptive resolution at which to operate the fingerprint sensing system with respect to the user based on a size of a super-pixel corresponding to the analyzed distribution of fingerprint pitches;
    set the fingerprint sensing system to the determined adaptive resolution; and obtain a fingerprint image of the user with respect to the fingerprint region sensed by using the fingerprint sensing system operated at the determined adaptive resolution.

14. The fingerprint sensing system of claim 13, wherein the distribution of fingerprint pitches comprises a distribution of ridge intervals between ridge lines included in the fingerprint region.

15. The fingerprint sensing system of claim 13, wherein the at least one processor analyzes at least one of a maximum fingerprint pitch, a most frequent fingerprint pitch, a minimum fingerprint pitch, and an average fingerprint pitch, with respect to the user.

16. The fingerprint sensing system of claim 13, wherein the at least one processor determines that the adaptive resolution is to be decreased when a fingerprint pitch is analyzed to be relatively large in the analyzed distribution, and determines that the adaptive resolution is to be increased when a fingerprint pitch is analyzed to be relatively small in the analyzed distribution, within a maximum sensing resolution supported by the fingerprint sensing system.

17. The fingerprint sensing system of claim 16, wherein the at least one processor determines the size of a super-pixel by determining the number of sub-pixels to maximize a difference in an amount of change in mutual capacitance between a ridge and a valley when the fingerprint region is sensed, and
the determined adaptive resolution is inversely proportional to the determined size of a super-pixel.

18. The fingerprint sensing system of claim 13, wherein the at least one processor obtains the partial image sensed with respect to the portion of the fingerprint region with a half resolution of the maximum sensing resolution supported by the fingerprint sensing system, and determines a sensing resolution corresponding to the size of a super-pixel to maximize a difference in an amount of change in mutual capacitance between a ridge and a valley when the fingerprint region is sensed.

19. The fingerprint sensing system of claim 13, wherein the at least one processor obtains candidate partial images corresponding to candidate adaptive resolutions obtained by sensing multiple times the portion of the fingerprint region with a plurality of different candidate adaptive resolutions, and scores the candidate partial images in order of sensing accuracy of the portion of the fingerprint region with respect to the analyzed distribution and determines a candidate adaptive resolution corresponding to a candidate partial image that is most accurately sensed among the candidate partial images as a result of the scoring, to be the adaptive resolution.

20. The fingerprint sensing system of claim 13, wherein the at least one processor determines a binning size of the fingerprint sensing system corresponding to the analyzed distribution, and when the binning size is determined, obtains the fingerprint image based on the determined adaptive resolution and the determined binning size, wherein the super-pixel corresponds to a unit bin in the determined binning size.

* * * * *